United States Patent
Okamoto

(10) Patent No.: US 9,415,545 B2
(45) Date of Patent: Aug. 16, 2016

(54) METHOD OF MANUFACTURING THREE-DIMENSIONAL SHAPED OBJECT

(71) Applicant: SEIKO EPSON CORPORATION, Tokyo (JP)

(72) Inventor: Eiji Okamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/533,459

(22) Filed: Nov. 5, 2014

(65) Prior Publication Data

US 2015/0140295 A1    May 21, 2015

(30) Foreign Application Priority Data

Nov. 18, 2013  (JP) .................... 2013-237648
Nov. 18, 2013  (JP) .................... 2013-237649

(51) Int. Cl.
| | |
|---|---|
| B29C 41/02 | (2006.01) |
| B29C 67/00 | (2006.01) |
| B33Y 10/00 | (2015.01) |
| B33Y 30/00 | (2015.01) |
| B33Y 50/02 | (2015.01) |

(52) U.S. Cl.
CPC ............. B29C 67/0081 (2013.01); B33Y 10/00 (2014.12); *B29C 67/0088* (2013.01); *B29C 2795/005* (2013.01); *B33Y 30/00* (2014.12); *B33Y 50/02* (2014.12); *Y10T 428/24893* (2015.01)

(58) Field of Classification Search
CPC .................................................. B29C 67/0081
USPC .................. 264/113, 128, 460, 461, 462, 463
See application file for complete search history.

(56) References Cited

U.S. PATENT DOCUMENTS

| | | | |
|---|---|---|---|
| 2002/0079601 A1 | 6/2002 | Russell et al. | |
| 2004/0222548 A1* | 11/2004 | Sano | B29C 67/0081 264/113 |
| 2005/0001356 A1 | 1/2005 | Tochimoto et al. | |
| 2007/0007698 A1 | 1/2007 | Sano | |
| 2010/0145469 A1* | 6/2010 | Barralet | B29C 67/0081 623/23.56 |

FOREIGN PATENT DOCUMENTS

| | | |
|---|---|---|
| JP | 2001-150556 A | 6/2001 |
| JP | 4432409 B2 | 3/2010 |
| JP | 5059832 B2 | 10/2012 |

* cited by examiner

*Primary Examiner* — Leo B Tentoni
(74) *Attorney, Agent, or Firm* — Global IP Counselors, LLP

(57) ABSTRACT

A method of manufacturing a three-dimensional shaped object is a method of manufacturing a three-dimensional shaped object with which unit layers are laminated. The method is characterized by including a layer formation step for using a three-dimensional shaping composition that contains a three-dimensional shaping powder composed of a plurality of particles to form a layer having a predetermined thickness A (μm), and an ink discharge step for discharging an ink that contains a binding agent onto the layer and forming the unit layers. The ink discharge step includes discharging two or more different kinds of the ink onto a discharge unit region which is narrower than $A^2$ (μm$^2$) on a surface of the layer where the ink is discharged.

6 Claims, 8 Drawing Sheets

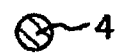

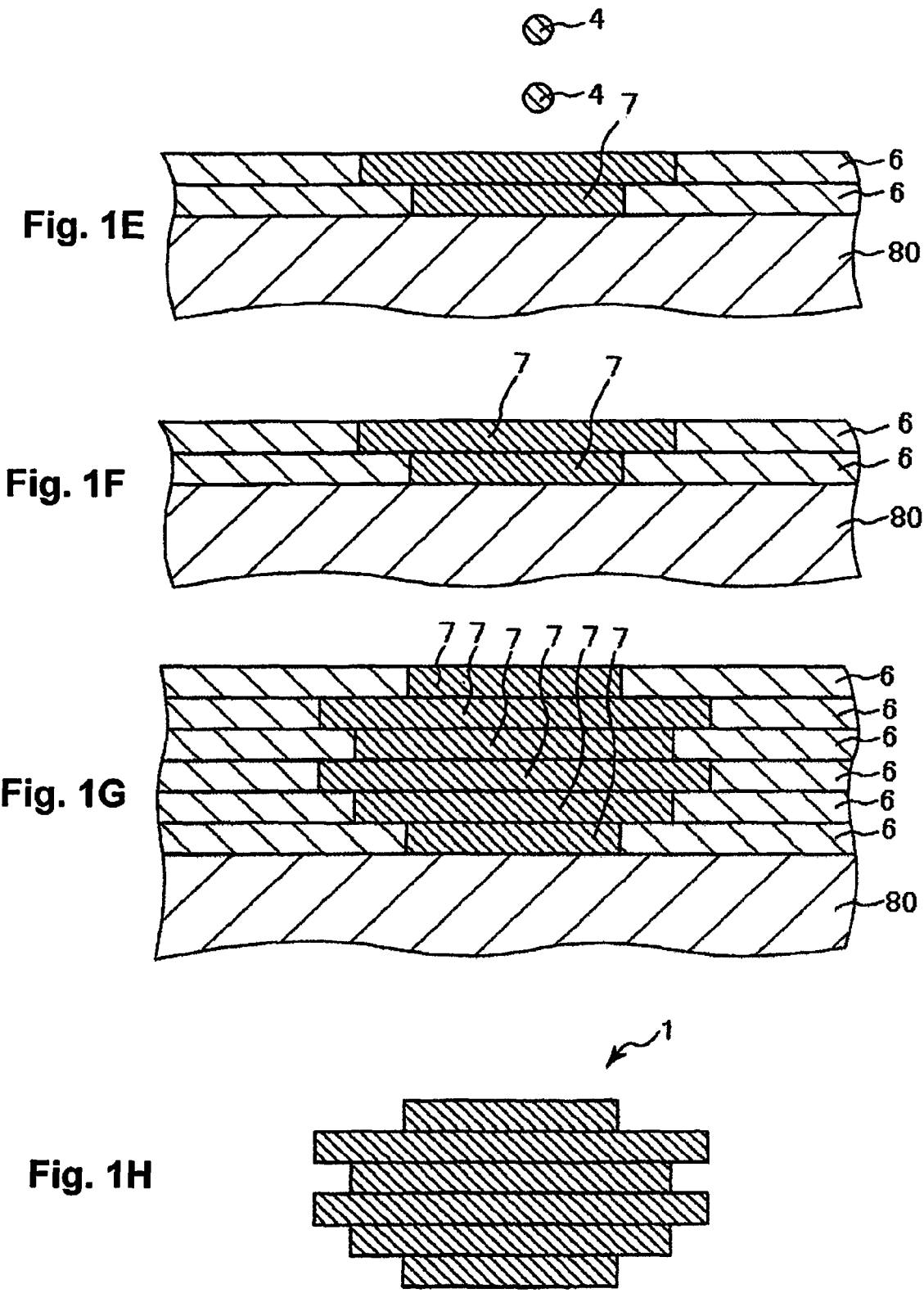

METHOD OF MANUFACTURING THREE-DIMENSIONAL SHAPED OBJECT

CROSS-REFERENCE TO RELATED APPLICATIONS

This application claims priority to Japanese Patent Application No. 2013-237648 filed on Nov. 18, 2013 and Japanese Patent Application No. 2013-237649 filed on Nov. 18, 2013. The entire disclosure of Japanese Patent Application Nos. 2013-237648 and 2013-237649 is hereby incorporated herein by reference.

BACKGROUND

1. Technical Field

The present invention relates to a method of manufacturing a three-dimensional shaped object, a three-dimensional shaped object, a three-dimensional shaped object manufacturing apparatus, a method of controlling a three-dimensional shaped object manufacturing apparatus, and a program for controlling a three-dimensional shaped object manufacturing apparatus.

2. Related Art

Methods of forming a three-dimensional shaped object on the basis of, for example, a model of a three-dimensional object generated by three-dimensional CAD software or the like have long been known.

One known method of forming a three-dimensional shaped object is a lamination method. A lamination method generally entails forming the three-dimensional shaped object by dividing the model of the three-dimensional object into a plurality of two-dimensional cross-sectional layers, and thereafter sequentially laminating cross-sectional members corresponding to each of the two-dimensional cross-sectional layers while the cross-sectional members are being shaped.

The lamination method makes it possible to immediately form absolutely any model of a three-dimensional shaped object intended to be shaped, and also obviates needs such as for creating a mold prior to shaping and therefore makes it possible to form the three-dimensional shaped object quickly as well as inexpensively. Also, because the three-dimensional shaped object is formed with the cross-sectional members, which are thin and planar, being laminated one layer at a time, it is possible to form even complex objects that have, for example, an internal structure so as to make an integral shaped object, without separation into a plurality of components.

One known form of such a lamination method is a technique for shaping the three-dimensional shaped object while also fixing a powder with a binding solution (for example, see Japanese laid-open patent publication No. 2001-150556). With this technique, when each of the layers is being formed, one practice has been to impart color to the three-dimensional shaped object by discharging an ink comprising a colorant onto places corresponding to an outer surface side of the three-dimensional shaped object.

However, conventional methods of manufacturing a three-dimensional shaped object have failed to provide sufficiently high resolution for the surface of the resulting three-dimensional shaped object.

SUMMARY

An objective of the present invention is to provide a three-dimensional shaped object which has high resolution and allows for vivid color expression, and another is to provide a method of manufacturing a three-dimensional shaped object, a three-dimensional shaped object manufacturing apparatus, a method of controlling a three-dimensional shaped object manufacturing apparatus, and a program for controlling a three-dimensional shaped object manufacturing apparatus which make it possible to efficiently manufacture a three-dimensional shaped object which has high resolution and allows for vivid color expression.

Such an objective is achieved by the present invention described below.

A method of manufacturing a three-dimensional shaped object according to one aspect of the invention is a method of manufacturing a three-dimensional shaped object with which unit layers are laminated. The method is characterized by comprising forming a layer having a predetermined thickness A (μm) by using a three-dimensional shaping composition that contains a three-dimensional shaping powder having a plurality of particles, and discharging an ink that contains a binding agent onto the layer and forming the unit layers. The discharging of the ink includes discharging two or more different kinds of the ink onto a discharge unit region which is narrower than $A^2$ (μm$^2$) on a surface of the layer where the ink is discharged.

This makes it possible to increase the resolution for the surface of the three-dimensional shaped object, and makes it possible to carry out a vivid color expression.

In the method of manufacturing the three-dimensional shaped object according to the aspect of the invention, preferably, a plurality of discharge unit regions are arrayed from the outer margin toward the interior of the unit layers.

This makes it possible to further increase the gradation and makes it possible to raise the resolution of the three-dimensional shaped object surface even more. As a result, more vivid color expression can be performed on the three-dimensional shaped object surface.

In the method of manufacturing the three-dimensional shaped object according to the aspect of the invention, preferably, the thickness A of the layer is 30 μm or greater and 500 μm or less.

This makes it possible to more effectively prevent the occurrence of an undesirable unevenness in the three-dimensional shaped object being manufactured or the like while also making the three-dimensional shaped object have adequately excellent productivity, and makes it possible to give the three-dimensional shaped object particularly excellent dimensional accuracy.

In the method of manufacturing the three-dimensional shaped object according to the aspect of the invention, preferably, the $A^2$ (μm$^2$) is smaller than double an impact surface area of the ink.

This makes it possible to raise the resolution of the three-dimensional shaped object surface even more.

In the method of manufacturing the three-dimensional shaped object according to the aspect of the invention, preferably, the ink is a color ink containing a colorant for cyan, magenta, yellow, black, or white, or a non-colored ink not containing the colorant.

This makes it possible to perform wider brightness expression in additional to further vivid color expression in the three-dimensional shaped object surface.

A three-dimensional shaped object of the invention is characterized by being manufactured by a method of manufacturing the three-dimensional shaped object according to the aspect of the invention.

This makes it possible to increase the resolution for the surface of the three-dimensional shaped object, and makes it possible to carry out a vivid color expression.

A three-dimensional shaped object according to one aspect of the invention is a three-dimensional shaped object with which unit layers are laminated. The three-dimensional shaped object is characterized by being manufactured by a method of manufacture comprising forming a layer having a predetermined thickness A (μm) by using a three-dimensional shaping composition that contains a three-dimensional shaping powder having a plurality of particles, and discharging an ink that contains a binding agent onto the layer and forming the unit layers. While the ink is discharged, two or more different kinds of the ink is discharged onto a discharge unit region which is narrower than $A^2$ (μm) on a surface of the layer where the ink is discharged.

This makes it possible to increase the resolution for the surface of the three-dimensional shaped object, and makes it possible to carry out a vivid color expression.

A three-dimensional shaped object manufacturing apparatus according to one aspect of the invention is a three-dimensional shaped object manufacturing apparatus for manufacturing a three-dimensional shaped object with which unit layers are laminated. The three-dimensional shaped object manufacturing apparatus is characterized by comprising a layer forming unit configured to form a layer having a predetermined thickness A (μm) by using a three-dimensional shaping composition that contains a three-dimensional shaping powder having a plurality of particles, and an ink discharging unit configured to discharge an ink that contains a binding agent onto the layer and form the unit layers. The ink discharging unit is further configured to discharge two or more different kinds of the ink onto a discharge unit region which is narrower than $A^2$ (μm$^2$) on a surface of the layer where the ink is discharged.

This makes it possible to manufacture a three-dimensional shaped object which has high resolution and allows for vivid color expression.

A method of controlling a three-dimensional shaped object manufacturing apparatus according to one aspect of the invention is a method of controlling a three-dimensional shaped object manufacturing apparatus for manufacturing a three-dimensional shaped object with which unit layers are laminated. The method of control is characterized in that the three-dimensional shaped object manufacturing apparatus comprises a layer forming unit configured to form a layer having a predetermined thickness A (μm) by using a three-dimensional shaping composition that contains a three-dimensional shaping powder having a plurality of particles, and an ink discharging unit configured to discharge an ink that contains a binding agent onto the layer and form the unit layers, and the method comprises controlling the ink discharging unit to discharge two or more different kinds the ink onto a discharge unit region which is narrower than $A^2$ (μm$^2$) on a surface of the layer where the ink is discharged.

This makes it possible to manufacture a three-dimensional shaped object which has high resolution and allows for vivid color expression.

A non-transitory computer readable medium recording a program for controlling a three-dimensional shaped object manufacturing apparatus according to one aspect of the invention is for controlling a three-dimensional shaped object manufacturing apparatus for manufacturing a three-dimensional shaped object with which unit layers are laminated. The program is characterized in that the three-dimensional shaped object manufacturing apparatus comprises a layer forming unit configured to form a layer having a predetermined thickness A (μm) by using a three-dimensional shaping composition that contains a three-dimensional shaping powder having a plurality of particles, and an ink discharging unit configured to discharge an ink that contains a binding agent onto the layer and form the unit layers, and the program is configured to cause the ink discharging unit to discharge two or more different kinds of the ink onto a discharge unit region which is narrower than $A^2$ (μm$^2$) on a surface of the layer where the ink is discharged.

This makes it possible to manufacture a three-dimensional shaped object which has high resolution and allows for vivid color expression.

In the method of manufacturing a three-dimensional shaped object according to the aspect of the invention, preferably, a total discharged amount of the ink that is discharged onto one of discharge unit regions is constant.

This makes it possible to increase the resolution for the surface of the three-dimensional shaped object, and makes it possible to carry out a vivid color expression. This makes it possible to have a small difference in the volume shrinkage rate among the plurality of discharge unit layers. As a result, the occurrence of an undesirable unevenness on the surface of the three-dimensional shaped object can be curbed.

In the method of manufacturing a three-dimensional shaped object according to the aspect of the invention, preferably, the volume shrinkage rate of the discharge unit region when made into the unit layers is constant irrespective of color.

This makes it possible to curb the occurrence of any unevenness caused by differences in the shrinkage rate at the surface of the three-dimensional shaped object. As a result, more vivid color expression can be performed on the three-dimensional shaped object surface.

BRIEF DESCRIPTION OF THE DRAWINGS

Referring now to the attached drawings which form a part of this original disclosure:

FIGS. 1A, 1B, 1C, 1D, 1E, 1F, 1G, and 1H are schematic diagrams illustrating respective steps as regards a preferred embodiment of a method of manufacturing a three-dimensional shaped object in the invention;

DETAILED DESCRIPTION OF EXEMPLARY EMBODIMENTS

Preferred embodiments of the present invention shall now be described in greater detail below, with reference to the accompanying drawings.

1. Method of Manufacturing Three-dimensional Shaped Object

First, a method of manufacturing a three-dimensional shaped object in the present invention shall be described.

Figure 2:
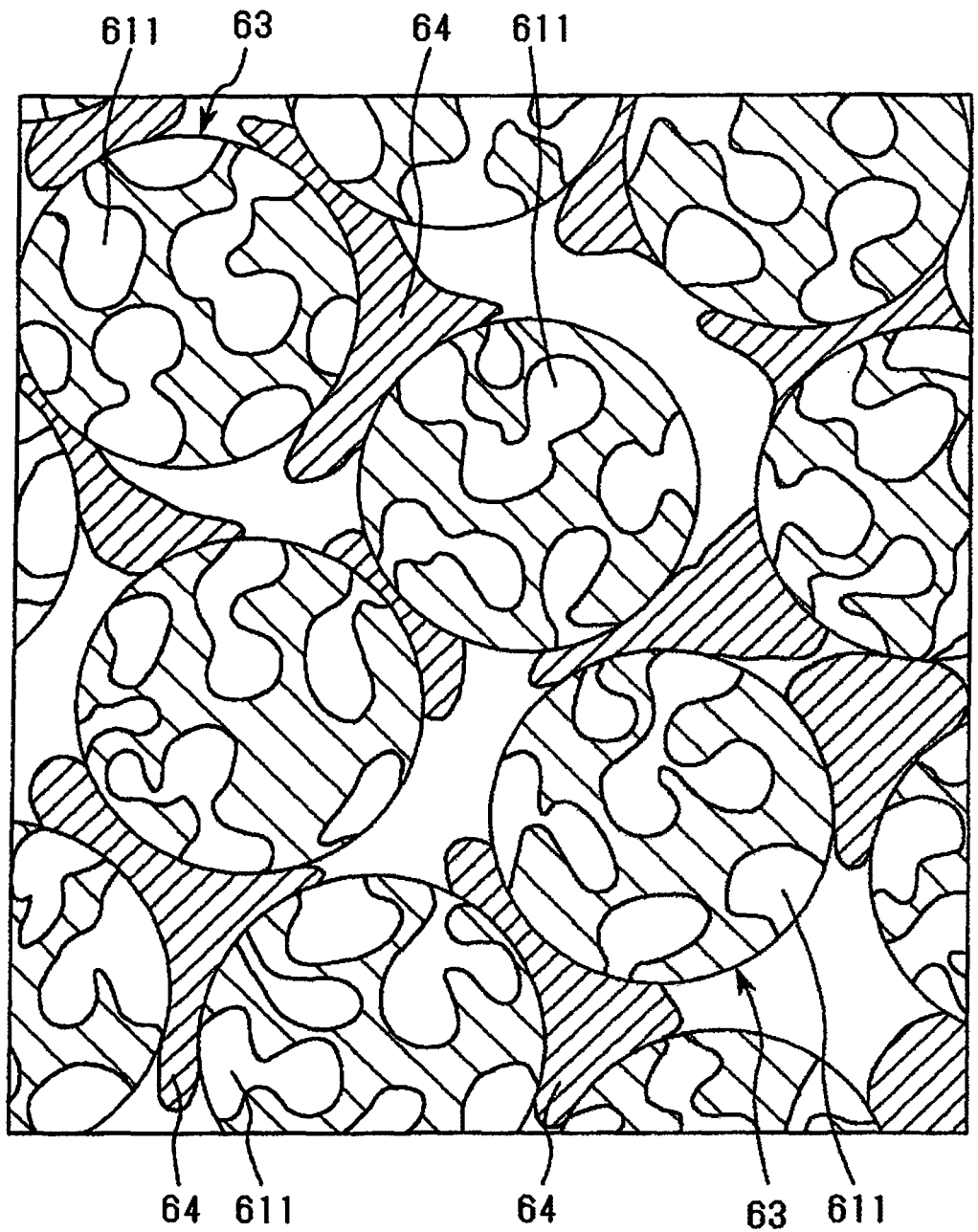
FIG. 2 is a cross-sectional view schematically illustrating the state in a layer (a three-dimensional shaping composition) immediately prior to an ink application step.
Figure 3:
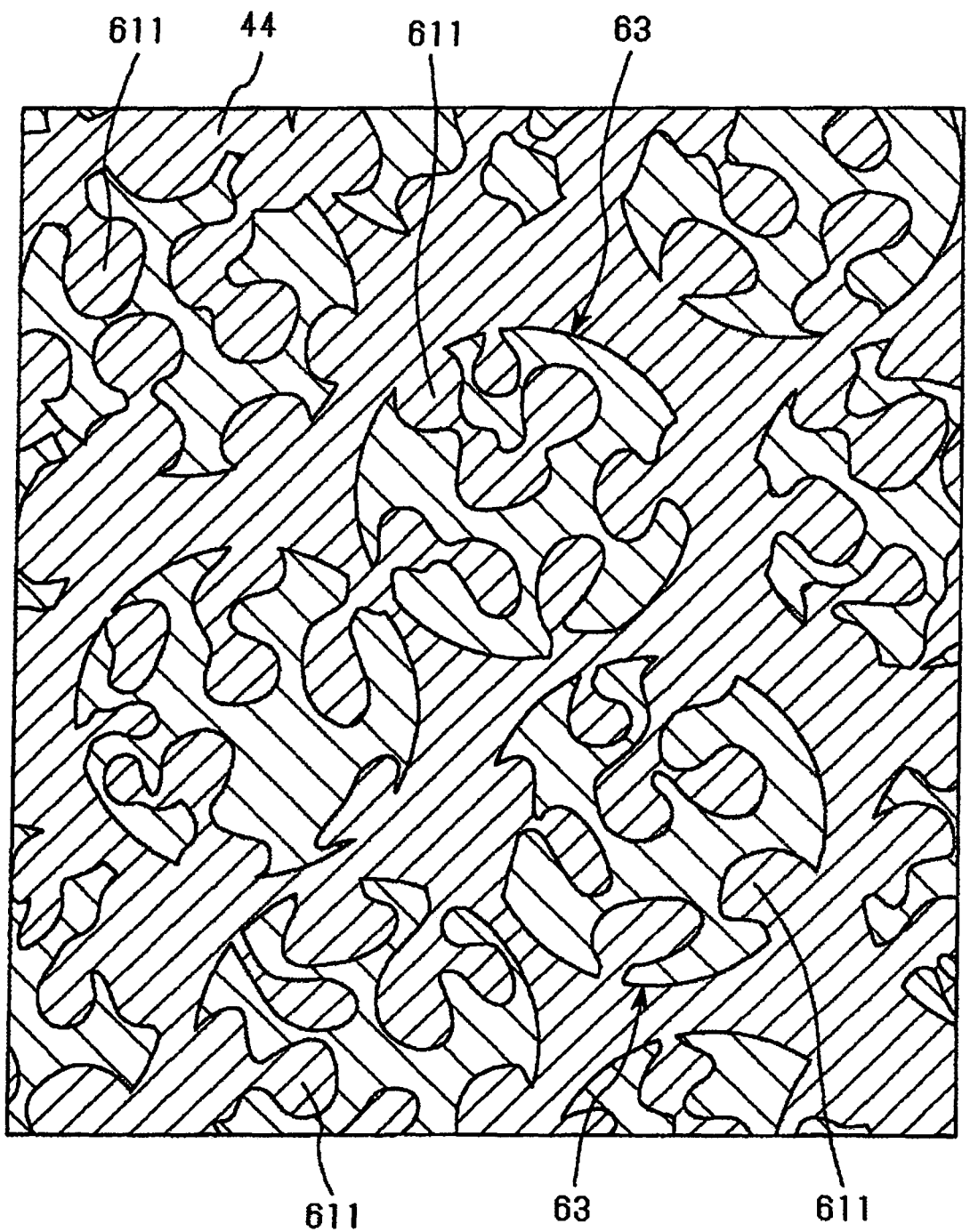
FIG. 3 is a cross-sectional view schematically illustrating a state where particles have been bound to one another by a binding agent.
Figure 4:
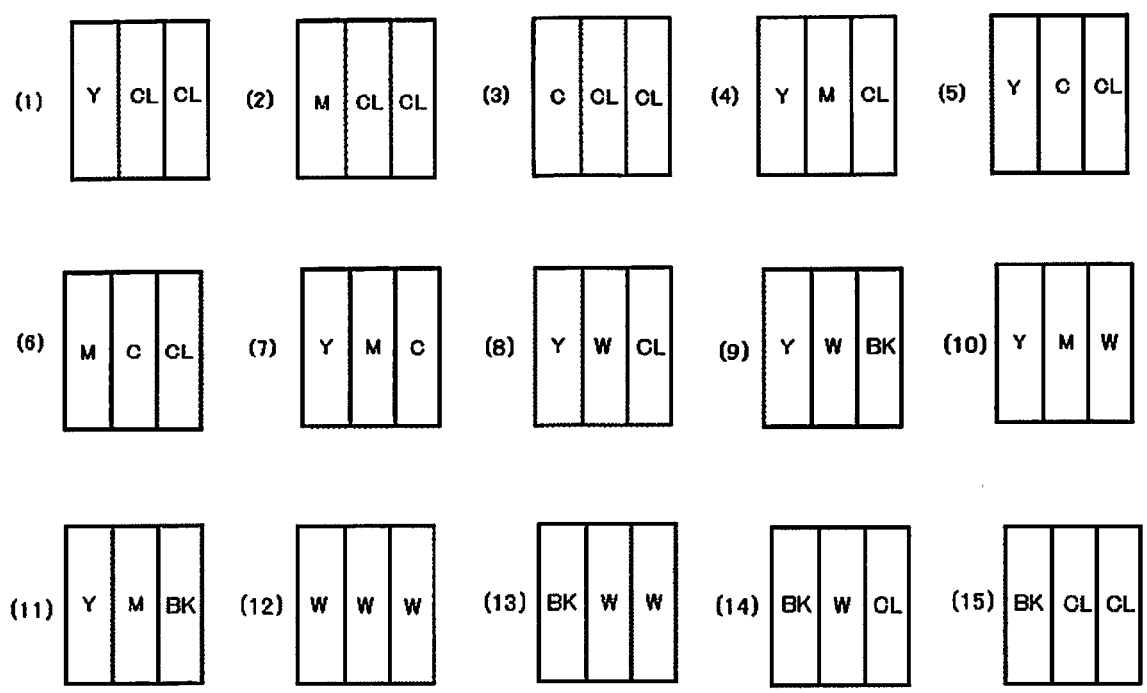
FIG. 4 is a schematic diagram illustrating combinations of colors in a discharge unit region.
Figure 5A:
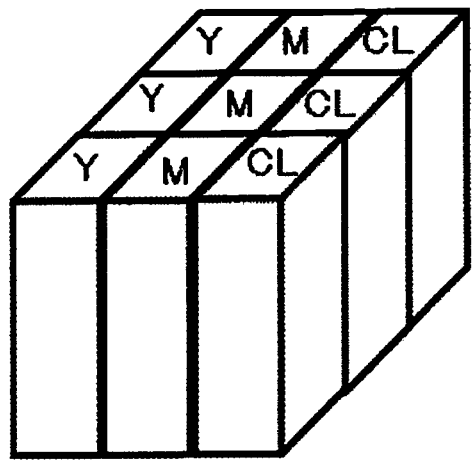
FIGS. 5A and 5B are schematic views illustrating a state where discharge unit regions have been arranged side by side going towards the inside of a layer.
Figure 5B:
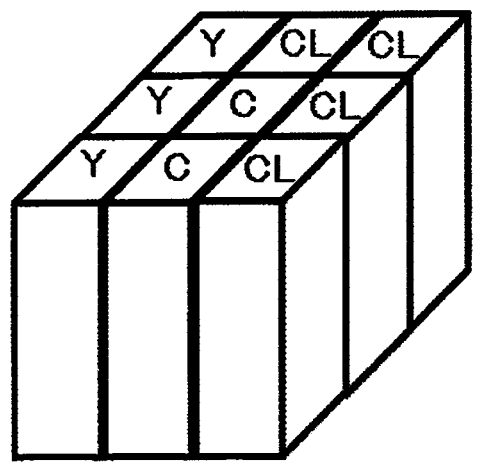

FIGS. 1A-1H are schematic diagrams illustrating respective steps as regards a preferred embodiment of a method of manufacturing a three-dimensional shaped object in the invention; FIG. 2 is a cross-sectional view schematically illustrating the state in a layer (a three-dimensional shaping composition) immediately prior to an ink application step; FIG. 3 is a cross-sectional view schematically illustrating a state where particles have been bound to one another by a binding agent; FIG. 4 is a schematic diagram illustrating combinations of colors in a discharge unit region; and FIGS. 5A and 5B are schematic views illustrating a state where discharge unit regions have been arranged side by side going towards the inside of a layer. In FIGS. 4, 5A, and 5B, Y, M, C, BK, W, and CL represent yellow, magenta, cyan, black, white, and transparent (clear, colorless), respectively.

As illustrated in FIGS. 1A-1H, the method of manufacture in the present embodiment comprises: a layer formation step (FIGS. 1A, 1D) for using a three-dimensional shaping composition that contains a three-dimensional shaping powder composed of a plurality of particles to form a layer 6 having a predetermined thickness A (µm); an ink application step (FIGS. 1B, 1E) for applying an ink 4 that contains a binding agent 44 to the layer 6 by inkjet; a curing step (FIGS. 1C, 1F) for curing the binding agent 44 contained in the ink 4 that has been applied to the layer 6 to forming a unit layer 7; these steps are repeated sequentially, and there is also later an unbound particle removal step (FIG. 1H) for removing those particles 63 constituting each of the layers 6 that have not been bound by the binding agent 44.

Layer Formation Step

Figure 1A:
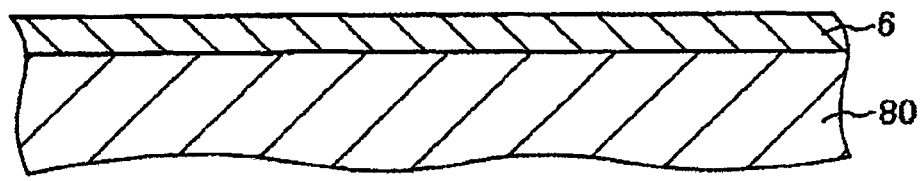

First, the three-dimensional shaping composition is used to form the layer 6 having the predetermined thickness A (µm) on a shaping stage 80 (FIG. 1A).

The three-dimensional shaping composition, as shall be described in greater detail below, comprises a plurality of particles 63 as well as a water-soluble resin 64. Containing the water-soluble resin 64 makes it possible to bind (temporarily fix) the particles 63 to one another (see FIG. 2) and possible to effectively prevent undesirable scattering of the particles or the like. This makes it possible to achieve improvements in safety for workers and in dimensional accuracy of a three-dimensional shaped object 1 being manufactured.

This step can be carried by using, for example, a method such as a squeegee method, a screen printing method, a doctor blade method, or a spin coating method.

Though not particularly limited, the thickness of the layer 6 formed in this step is preferably 30 to 500 µm, more preferably 70 to 150 µm. This makes it possible to more effectively prevent the occurrence of an undesirable unevenness in the three-dimensional shaped object 1 being manufactured or the like while also making the three-dimensional shaped object 1 have adequately excellent productivity, and makes it possible to give the three-dimensional shaped object 1 particularly excellent dimensional accuracy.

In, however, a case where, for example, the three-dimensional shaping composition has a solid form (pellet form) (for example, a case where the three-dimensional shaping composition is one that contains a water-soluble resin (thermoplastic resin) 12 that has a solid form at near a storage temperature (for example, room temperature (25° C.)) and is one where the plurality of particles 63 are in a state of having been bound by the water-soluble resin), then such layer formation as described above may be preceded by melting the three-dimensional shaping composition by heating to effectuate a flowable state. This makes it possible to effective form the layer in the simple method described above, and makes it possible to more effectively prevent an undesirable variation in the thickness of the layer 6 thus formed. As a result, a three-dimensional shaped object 1 having better dimensional accuracy can be manufactured at higher productivity.

Ink Application Step

Figure 1B:
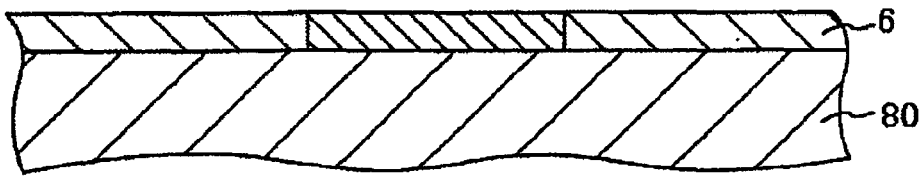

Later, the ink 4 that contains the binding agent 44 is applied to the layer 6 by inkjet (FIG. 1B).

In this step, the ink is selectively applied only onto those sites of the layer 6 that correspond to the substance of the three-dimensional shaped object 1 (sites where there is substance).

This makes it possible for the particles 63 constituting the layer 6 to be firmly bound by the binding agent 44, and makes it possible to give excellent mechanical strength to the three-dimensional shaped object 1 that is ultimately obtained. In a case where the three-dimensional shaping composition constituting the layer 6 is one that contains a plurality of porous particles 63, then the binding agent 44 enters into holes 611 of the particles 63 and an anchoring effect is exerted; consequently, the binding between the particles 63 can be given excellent binding strength (binding strength through the binding agent 44), and the three-dimensional shaped object 1 that is ultimately obtained can be given excellent mechanical strength (see FIG. 3). When the binding agent 44 constituting the ink 4 that is applied in this step enters into the holes 611 of the particles 63, then this makes it possible to effectively prevent an undesirable wetting and spreading of the ink. As a result, the three-dimensional shaped object 1 that is ultimately obtained can be given high dimensional accuracy.

In this step, because the ink 4 is applied by inkjet, the ink 4 can be applied with favorable reproducibility even when the pattern of application of the ink 4 is finely shaped. As a result, coupled with the effect obtained from when the binding agent 44 enters into the holes 611 of the particles 63, the three-dimensional shaped object 1 that is ultimately obtained can be given particularly high dimensional accuracy.

Also, in this step, the ink 4, which contains a colorant for the purpose of applying color is discharged onto the layer 6 corresponding to an outer margin side of the three-dimensional shaped object 1.

Also, in this step, the layer 6 corresponding to the vicinity of the outer margin of the three-dimensional shaped object 1 is divided into a plurality of discharge unit regions where the ink 4 is discharged, and the ink 4 is applied to the unit discharge regions thereof.

The invention is characterized in that in the ink discharge step, inks of two or more different colors are discharged onto the discharge unit regions, which are narrower than $A^2$ ($\mu m^2$), of a surface of the layer where the ink is discharged. This makes it possible to combine a variety of colors in the discharge unit regions. The gradation can also be increased and as well the resolution can be raised. As a result, a three-dimensional shaped object allowing for vivid color expression can be manufactured.

Inks of a variety of colors can be discharged onto the discharge unit regions. In the invention, the variety of colors is understood to also encompass colorless (transparent or translucent).

The constituent materials of the inks 4 shall be described in greater detail below, but preferably the inks 4 are constituted of a colored ink containing a colorant for cyan, magenta, yellow, black, or white, or a non-colored ink not containing any colorant. This makes it possible to perform wider brightness expression in additional to further vivid color expression in the three-dimensional shaped object surface.

Examples of combinations of colors for the inks discharged onto the discharge regions could include: yellow and colorless as illustrated in FIG. 4(1); magenta and colorless as illustrated in FIG. 4(2); cyan and colorless as illustrated in FIG. 4(3); yellow, magenta, and colorless as illustrated in FIG. 4(4); yellow, cyan, and colorless as illustrated in FIG. 4(5); magenta, cyan, and colorless as illustrated in FIG. 4(6); yellow, magenta, and cyan as illustrated in FIG. 4(7); yellow, white, and colorless as illustrated in FIG. 4(8); yellow, white, and black as illustrated in FIG. 4(9); yellow, magenta, and white as illustrated in FIG. 4(10); yellow, magenta, and black as illustrated in FIG. 4(11), white, white, and white as illustrated in FIG. 4(12); black, white, and white as illustrated in FIG. 4(13); black, white, and colorless as illustrated in FIG. 4(14); and black, colorless, and colorless as illustrated in FIG. 4(15). The combinations are not, however, limited thereto.

Preferably, there are a plurality of the discharge unit regions arrayed from the outer margin of the layer 6 (unit layer 7) toward the interior (the inside direction of the three-dimensional shaped object 1). This makes it possible to further increase the gradation and makes it possible to raise the resolution of the three-dimensional shaped object surface even more. As a result, more vivid color expression can be performed on the three-dimensional shaped object surface.

Examples of the arraying of the discharge unit regions could include: a configuration with which, as illustrated in FIG. 5A, there are three discharge regions constituted of yellow, magenta, and colorless that are arranged side by side from the three-dimensional shaped object surface side; or a configuration with which, as illustrated in FIG. 5B, there are two discharge regions constituted of yellow, cyan, and colorless arranged side by side from the three-dimensional shaped object surface side and thereafter a discharge region constituted of yellow and colorless is arranged; or the like.

$A^2$ ($\mu m^2$) is preferably smaller than double the impact surface area of the inks 4. This makes it possible to raise the resolution of the three-dimensional shaped object surface even more.

The impact surface area of the inks 4 is preferably 70 to 18,000 $\mu m^2$, more preferably 700 to 8,000 $\mu m^2$. This makes it possible to raise the resolution of the three-dimensional shaped object surface even more.

Curing Step

Figure 1C:
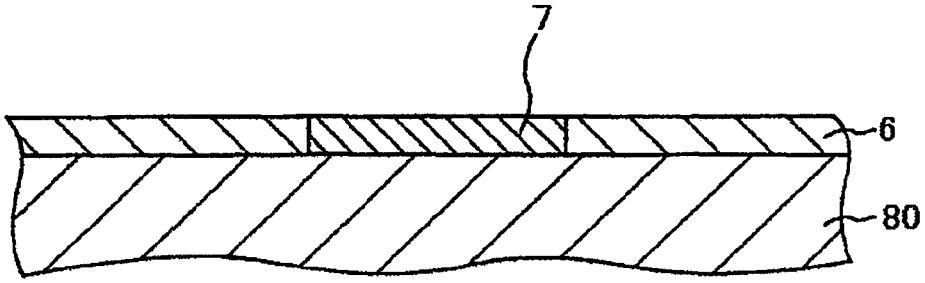
Figure 1D:
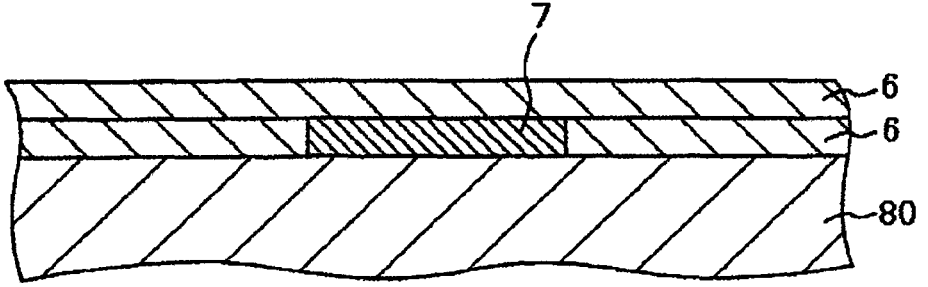

Later, the binding agent 44 applied to the layer 6 is cured to form a unit layer (cured section) 7 (FIG. 1C). This makes it possible to make there be a particularly excellent binding strength between the binding agent 44 and the particles 63, and consequently makes it possible to give excellent mechanical strength to the three-dimensional shaped object 1 that is ultimately obtained.

This step varies depending on the type of the binding agent 44, but examples could include being performed by heating in a case where the binding agent 44 is a thermo-curable resin, or being performed by irradiating with a corresponding light in a case where the binding agent 44 is a photo-curable resin (for example, by irradiating with ultraviolet rays in a case where the binding agent 44 is an ultraviolet-curable resin).

The ink application step and the curing step may be performed concurrently. That is to say, the curing reaction may be advanced sequentially from sites to which the inks 4 have been applied before the complete pattern of an entire single layer 6 is formed.

Later, this series of steps described above is repeated (see FIGS. 1D, 1E, 1F). This effectuates a state where the particles 63 are bound for those sites of each of the layers 6 at which the inks 4 have been applied, and produces a three-dimensional shaped object 1 resulting from a laminate with which a plurality of the layers 6 in such a state have been laminated together (see FIG. 1G).

The inks 4 that have been applied to the layers 6 in the second and subsequent iterations of the ink application step (see FIG. 1D) are utilized for binding together of the particles 63 constituting those layers 6, and also some of the inks 4 that have been applied penetrate to the layers 6 therebelow. For this reason, the inks 4 are utilized not only for binding together of the particles 63 in respective layers 6, but also for binding together of particles 63 across adjacent layers. As a result, the three-dimensional shaped object 1 that is ultimately obtained is given excellent mechanical strength as a whole.

Unbound Particle Removal Step

Then, after this series of steps has been repeated, the unbound particle removal step 91*h*) for removing those particles 63 constituting each of the layers 6 that have not been bound by the binding agent 44 (the unbound particles) is performed as a post-treatment step. The three-dimensional shaped object 1 is thereby retrieved.

Examples of a specific method for this step could include a method of dispelling the unbound particles with a brush or the like, a method of removing the unbound particles by suction, a method of blowing a gas such as air, a method of applying a liquid such as water (for example, a method of immersing the laminate obtained in the manner described above into a liquid, a method of spraying a liquid, or the like), or a method of applying a vibration such as ultrasonic vibration. Two or more types of methods selected from these could also be performed in combination. More specific examples might be a method of blowing a gas such as air and thereafter immersing in a liquid such as water, or a method of applying an ultrasonic vibration in a state of having been immersed in a liquid such as water. It would be particularly preferable to use a method of applying a liquid that contains water to the laminate obtained in the manner described above (in particular, a method of immersing in a liquid that contains water). In so doing, though those particles 63 constituting each of the layers 6 that have not been bound by the binding agent 44 are temporarily fixed by the water-soluble resin 64, using a liquid that contains water causes the water-soluble resin 64 to dissolve and releases this temporary fixation, thus making it possible to more easily and more reliably remove the particles from the three-dimensional shaped object 1. Also, the creation of defects such as scratches in the three-dimensional shaped object 1 when the unbound particles are being removed can be more reliably prevented. Employing such a method also can serve doubly to clean the three-dimensional shaped object 1.

The three-dimensional shaped object manufactured by the method of manufacture described above has a surface that has undergone vivid coloring at high resolution.

2. Three-dimensional Shaped Object Manufacturing Apparatus

Next, a three-dimensional shaped object manufacturing apparatus 100 as in the present embodiment shall now be described.

Figure 6:
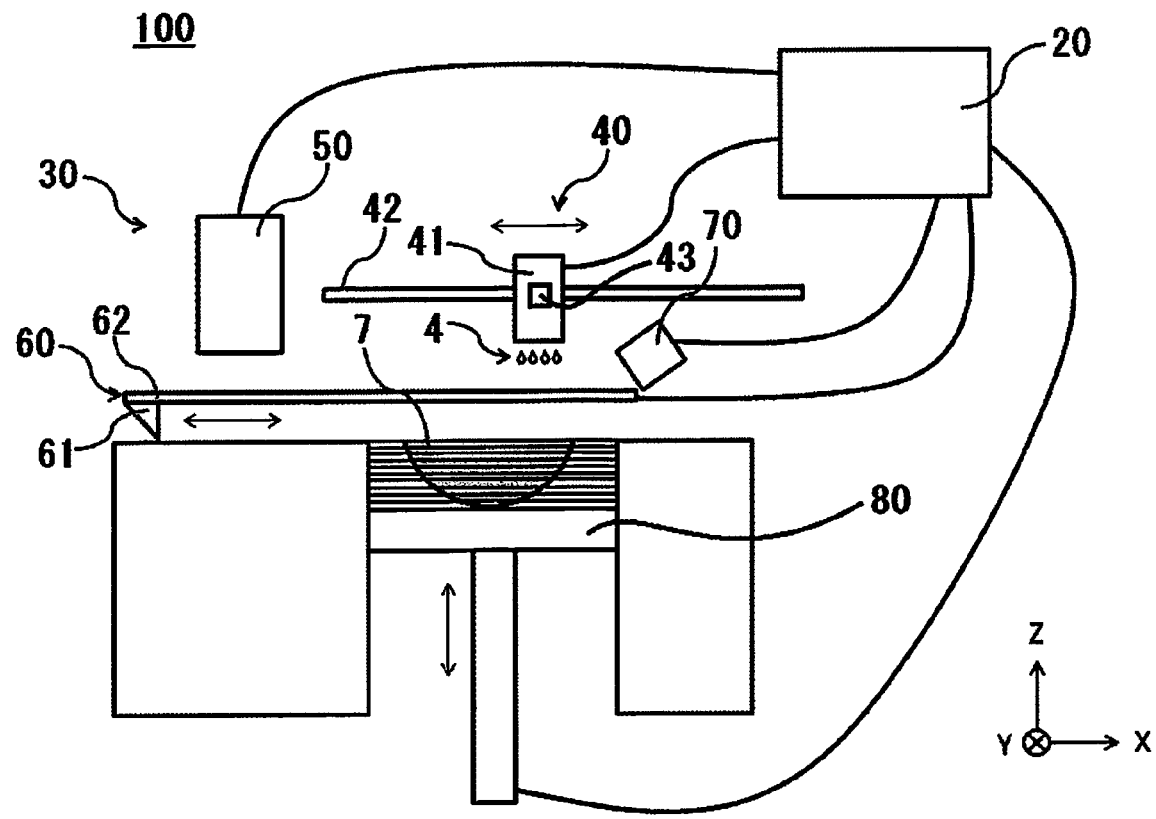
FIG. 6 is a schematic diagram illustrating a three-dimensional shaped object manufacturing apparatus for manufacturing a three-dimensional shaped object.
Figure 7:
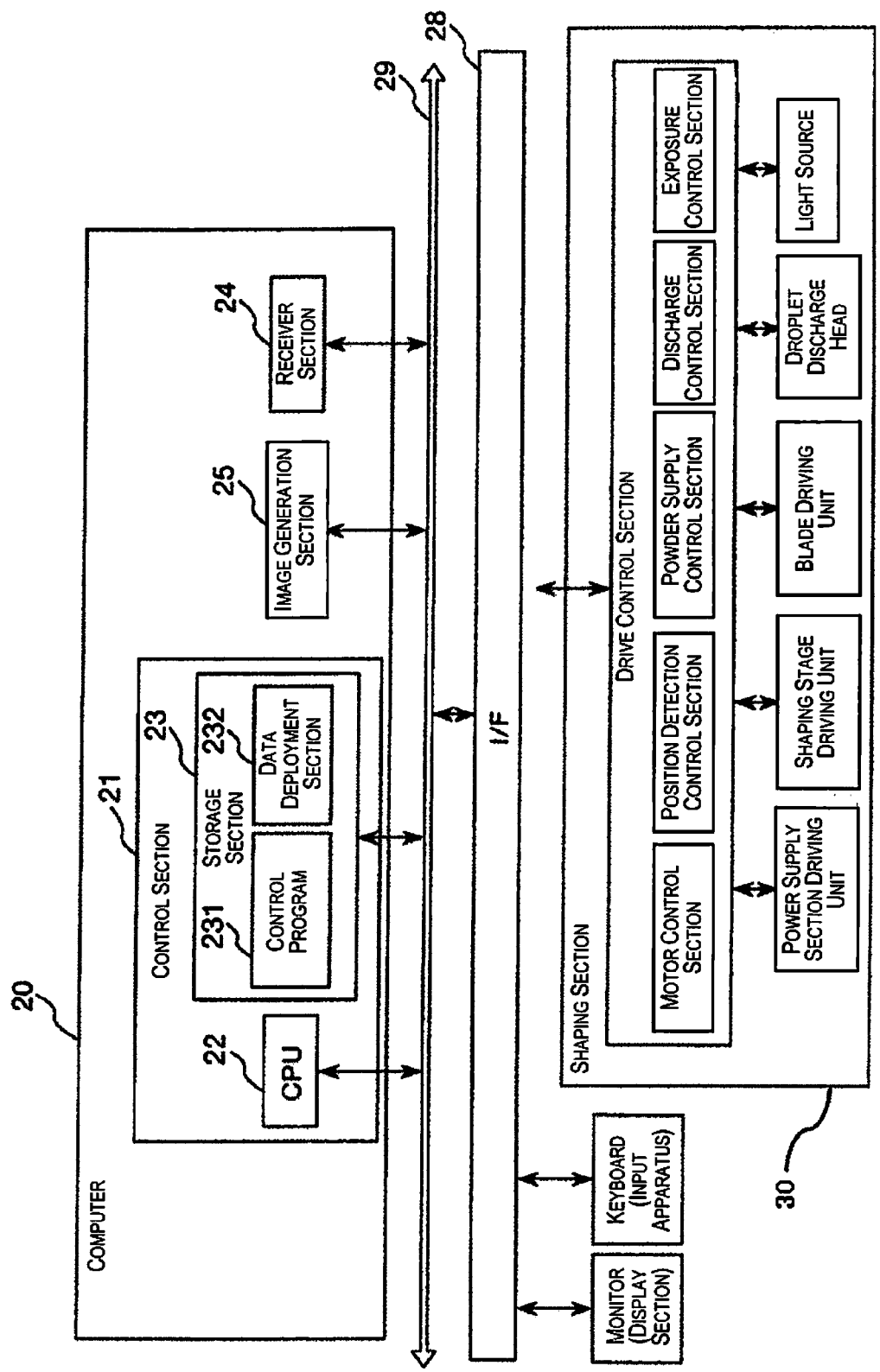
FIG. 7 is a block diagram of a control section belonging to the three-dimensional shaped object manufacturing apparatus illustrated in FIG. 6.

FIG. 6 is a schematic diagram illustrating a three-dimensional shaped object manufacturing apparatus for manufacturing the three-dimensional shaped object. FIG. 7 is a block diagram of a control section belonging to the three-dimensional shaped object manufacturing apparatus illustrated in FIG. 6.

The three-dimensional shaped object manufacturing apparatus 100 is an apparatus to which the method of manufacturing a three-dimensional shaped object as described above is applied, wherein the three-dimensional shaped object 1 is formed by generating a model of the unit layers 7, and sequentially laminating each of the unit layers 7 while also sequentially shaping each of the unit layers 7 on the basis of this model.

As illustrated in FIGS. 7 and 8, the three-dimensional shaped object manufacturing apparatus 100 has a computer 20 for, generating a model of the unit layers 7 and the like, and a shaping section 30 for forming the three-dimensional shaped object 1.

Each of the parts constituting the three-dimensional shaped object manufacturing apparatus 100 shall now be described in greater detail below.

Shaping Section 30

As illustrated in FIG. 7, the shaping section 30 is provided with an ink discharge section (ink discharging unit) 40, a powder supply section 50, a powder control section 60, a light source 70, and the shaping stage 80, which are all electrically connected to the computer 20.

The ink discharge section 40 is an inkjet format and has a mounted droplet discharge head 41 for discharging droplets of the inks 4. The ink discharge section 40 is also provided with an ink supply section (not shown). In the present embodiment, a droplet discharge head 41 of a so-called piezoelectric drive format is employed. The droplet discharge head 41 is configured so that the discharged amounts of the inks 4 can be modified in accordance with the command of a control section 21 (described below).

The ink discharge section 40 also has an X-direction movement section 42 and a Y-direction movement section 43 for moving the droplet discharge head 41 in the XY plane.

The powder supply section 50 has a function for supplying the three-dimensional shaping powder (also called simply "the powder" hereinafter) to the shaping stage 80 (described below). The powder supply section 50 is configured so as to be driven by a powder supply section driving unit (not shown).

The powder control section 60 is provided with a blade 61 and a guide rail 62 for regulating the operation of the blade 61. The powder control section 60 uses the blade 61 to control the powder supplied from the powder supply section 50, and has a function for forming the layers 6 of the predetermined thickness A (μm), which are constituted of the powder, on the shaping stage 80.

The blade 61 has a blade shape that is elongated in the Y-direction and pointed at a lower tip. The blade 61 is configured so as to be driven in the X-direction along the guide rail 62 by a blade driving unit (not shown).

The powder supply section 50 and the powder control section 60 together constitute a layer forming unit.

The light source 70 has a function for curing the inks 4 that have been applied to the layers of powder formed by the powder control section.

The light source 70 is configured so as to emit ultraviolet light. Examples of what can be employed as the light source 70 include a mercury lamp, a metal halide lamp, a xenon lamp, or an excimer lamp.

The shaping stage 80 has a rectangular shape in the XY cross-section. The powder is bound by the inks 4 and forms the unit layers 7 on this shaping stage 80.

The shaping stage 80 is movable in the Z-direction by a shaping stage driving unit (not shown).

The shaping stage 80 moves downward by an amount commensurate with the thickness of the layer 6 that must be formed, and there the layer 6 is formed by the powder supply section 50 and the powder control section 60.

The shaping section 30 is also provided with a drive control section (not shown).

The drive control section has a motor control section, a position detection control section, a powder supply control section, a discharge control section, and an exposure control section.

The motor control section separately and individually controls the driving of the droplet discharge head 41 in the XY direction, the driving of the blade 61, and the driving of the shaping stage 80, on the basis of an instruction coming from a CPU of the computer 20 (described below).

The position detection control section controls separately and individually the position of the droplet discharge head 41, the position of the blade 61, and the position of the shaping stage 80 on the basis of an instruction coming from the CPU.

The powder supply control section controls the driving of the powder supply section 50 (the supply of the powder) on the basis of an instruction coming from the CPU.

The discharge control section controls the driving of the droplet discharge head 41 (the discharging of the droplets) on the basis of an instruction coming from the CPU.

The exposure control section controls the light-emitting state of the light source 70 on the basis of an instruction coming from the CPU.

Computer 20

As illustrated in FIG. 7, the computer 20 has a control section 21 for controlling the operation of each of the parts of the shaping section 30, a receiver section 24, and an image generation section 25.

The control section 21 has a central processing unit (CPU) 22 and a storage section 23.

The CPU 22 carries out a variety of computational processes as a processor, and executes a control program 231.

The storage section 23 has a read-only memory (ROM), a random access memory (RAM), and the like. Set in the storage section 23 are: a region for storing the control program 231, which describes the procedure of control for the operations in the shaping section 30; a data deployment section 232, which is a region for temporarily deploying a variety of forms of data; and the like. The storage section 23 is connected to the CPU 22 via a data bus 29.

The image generation section 25 and the receiver section 24 are connected to the control section 21 via the data bus 29, as well. Also connected to the control section 21 is the drive control section of the shaping section 30, via an input/output interface 28 and the data bus 29. The aforementioned powder supply section driving unit, shaping stage driving unit, blade driving unit, droplet discharge head, and the light source are also each connected to the drive control section, via the input/output interface 28 and the data bus 29.

The image generation section 25 has a function for manufacturing a model of the three-dimensional shaped object 1 or the like. The image generation section 25 is constituted of software for generating a three-dimensional object such as three-dimensional computer-aided design (CAD), or the like.

The image generation section 25 has a three-dimensional shaped object model generation function for generating a model of the three-dimensional shaped object 1, and a function for generating a two-dimensional model for representing an outer surface of the model of the three-dimensional shaped object 1 or the like with a two-dimensional model of triangles, quadrangles, or other polygons, such as with standard triangulated language (STL). That is to say, in the image generation section 25, there is a function for generating three-dimensional shape data of the three-dimensional shaped object 1.

The image generation section 25 also has a function for cutting the model of the three-dimensional shaped object 1 into layers to generate a model of the unit layers 7.

Unit layer data generated with the image generation section 25 is saved in the storage section 23, and transmitted to the drive control section of the shaping section 30 via the input/output interface 28 and the data bus 29. The shaping section 30 is then driven on the basis of the transmitted unit layer data.

The receiver section 24 is provided with a universal serial bus (USB) port, a LAN port, or the like. The receiver section 24 has a function for receiving an original object for generating the model of the three-dimensional shaped object 1 from an external device (not shown) such as a scanner.

A monitor (display apparatus) and a keyboard (input apparatus) are also connected (not shown) to the computer 20. The monitor and the keyboard are each connected to the control section 21 via the input/output interface and the data bus.

The monitor has a function for displaying an image file acquired at the receiver section 24 on an image display region. Being provided with the monitor makes it possible for an operator to visually ascertain image files and the like.

The input apparatus is not limited to being a keyboard and may instead be a mouse, a track ball, a touch panel, or the like.

In the three-dimensional shaped object manufacturing apparatus 100 as described above, the three-dimensional shaped object 1 is obtained by first generating the unit layer data on the basis of the three-dimensional shape data, then forming the layers 6 of the three-dimensional shaping powder (the three-dimensional shaping composition comprising the three-dimensional shaping powder) on the shaping stage 80 on the basis of the unit layer data, and applying the inks 4 to form the unit layers 7, and then sequentially laminating the unit layers 7 thus formed a plurality of times.

Also, the three-dimensional shaped object manufacturing apparatus 100 as described above is configured so as to discharge the inks 4 of two or more different colors onto the discharge unit regions narrower than $A^2$ ($\mu m^2$) on the surfaces of the layers 6 where the inks 4 are discharged. In other words, the storage section 23 stores such a control program that the ink discharging unit discharges the inks 4 of two or more different colors onto the discharge unit regions narrower than $A^2$ ($\mu m^2$) on the surfaces of the layers 6 where the inks 4 are discharged.

3. Three-Dimensional Shaping Composition

Next, the three-dimensional shaping composition shall be described in greater detail.

The three-dimensional shaping composition is one that comprises the three-dimensional shaping powder and the water-soluble resin 64.

Each of the components shall be described in greater detail below.

Three-Dimensional Shaping Powder

The three-dimensional shaping powder is constituted of the plurality of particles 63.

Any kind of particle can be used as the particles 63, but the particles 63 are preferably constituted of porous particles. This makes it possible to cause the binding agent 44 to favorably penetrate into the holes when the three-dimensional shaped object 1 is being manufactured, and consequently enables favorable usage in manufacturing a three-dimensional shaped object that has excellent mechanical strength.

Examples of constituent materials for the porous particles constituting the three-dimensional shaping powder include inorganic materials, organic materials, and composites thereof.

Examples of inorganic materials constituting the porous particles could include a variety of metals or metal compounds. Examples of metal compounds could include: a variety of metal oxides such as silica, alumina, titanium oxide, zinc oxide, zirconium oxide, tin oxide, magnesium oxide, and potassium titanate; a variety of metal hydroxides such as magnesium hydroxide, aluminum hydroxide, and calcium hydroxide; a variety of metal nitrides such as silicon nitride, titanium nitride, and aluminum nitride; a variety of metal carbides such as silicon carbide and titanium carbide; a variety of metal sulfides such as zinc sulfide; carbonates of a variety of metals such as calcium carbonate and magnesium carbonate; sulfates of a variety of metals such as calcium sulfate and magnesium sulfate; silicates of a variety of metals such as calcium silicate and magnesium silicate; phosphates of a variety of metals such as calcium phosphate; borates of a variety of metals such as aluminum borate and magnesium borate; and composites thereof.

Examples of organic materials constituting the porous particles could include synthetic resins and natural polymers, more specific examples being polyethylene resin; polypropylene; polyethylene oxide; polypropylene oxide, polyethylenimine; polystyrene; polyurethane; polyurea; polyester; silicone resin; acrylic silicone resin; polymers for which the constituent monomers are a (meth)acrylic acid ester such as poly(methyl methacrylate); crosspolymers for which the constituent monomers are a (meth)acrylic acid ester such as methyl methacrylate crosspolymer (ethylene acrylic acid copolymer resin or the like); polyamide resins such as nylon 12, nylon 6, or crosspolymer nylon; polyimide; carboxymethyl cellulose; gelatin; starch; chitin; and chitosan.

Of these, the porous particles are preferably constituted of an inorganic material, more preferably constituted of a metal oxide, and even more preferably constituted of silica. This makes it possible to give the three-dimensional shaped object particularly excellent properties such as mechanical strength and light resistance. The effects described above also become more prominent in particular when the porous particles are constituted of silica. Additionally, silica possesses excellent fluidity as well, and therefore is advantageous in forming layers of more highly uniform thickness and also makes it possible to give the three-dimensional shaped object 1 particularly excellent productivity and dimensional accuracy.

A commercially available form of silica can be favorably used. More specific examples include: Mizukasil P-526, Mizukasil P-801, Mizukasil NP-8, Mizukasil P-802, Mizukasil P-802Y, Mizukasil C-212, Mizukasil P-73, Mizukasil P-78A, Mizukasil P-78F, Mizukasil P-87, Mizukasil P-705, Mizukasil P-707, Mizukasil P-707D, Mizukasil P-709, Mizukasil C-402, Mizukasil C-484 (made by Mizusawa Industrial Chemicals); Tokusil U, Tokusil UR, Tokusil GU, Tokusil AL-1, Tokusil GU-N, Tokusil N, Tokusil NR, Tokusil PR, Solex, Fine Seal E-50, Fine Seal T-32, Fine Seal X-30, Fine Seal X-37, Fine Seal X-37B, Fine Seal X-45, Fine Seal X-60, Fine Seal X-70, Fine Seal RX-70, Fine Seal A, Fine Seal B (made by Tokuyama); Sipernat, Carplex FPS-101, Carplex CS-7, Carplex 22S, Carplex 80, Carplex 80D, Carplex XR, Carplex 67 (made by DSL Japan); Syloid 63, Syloid 65, Syloid 66, Syloid 77, Syloid 74, Syloid 79, Syloid 404, Syloid 620, Syloid 800, Syloid 150, Syloid 244, Syloid 266 (made by Fuji Silysia Chemical); and Nipgel AY-200, Nipgel AY-6A2, Nipgel AZ-200, Nipgel AZ-6A0, Nipgel BY-200, Nipgel BY-200, Nipgel CX-200, Nipgel CY-200, Nipseal E-150J, Nipseal E-220A, Nipseal E-200A (made by Tosoh Silica).

The porous particles also preferably have undergone a hydrophobic treatment. However, in general, the binding agent 44 included in the inks 4 will tend to be hydrophobic. As such, having the porous particles be ones that have undergone a hydrophobic treatment makes it possible to cause the binding agent 44 to more favorably penetrate into the holes of the porous particles. As a result, the anchoring effect is more prominent and the resulting three-dimensional shaped object 1 can be given even more excellent mechanical strength. Additionally, when the hydrophobic particles are ones that have undergone a hydrophobic treatment, favorable re-use is possible. In a more detailed description, when the porous particles are ones that have undergone a hydrophobic treatment, then there is decreased affinity between the porous particles and a water-soluble resin (described below), therefore preventing entry into the holes. As a result, in the three-dimensional shaped object 1, porous particles in regions where the inks are not applied can be recovered at high purity, it being readily possible to remove impurities by washing with water or the like. For this reason, mixing the recovered three-dimensional shaping powder again with the water-soluble resin or the like at a predetermined ratio makes it possible to reliably obtain a three-dimensional shaping powder that has been controlled to a desired composition.

The porous particles constituting the three-dimensional shaping powder may undergo any hydrophobic treatment provided that the hydrophobic treatment raises the hydrophobicity of the porous particles, but a preferable one is to introduce a hydrocarbon group. This makes it possible to give the particles an even higher hydrophobicity. This also makes it possible to easily and reliably impart a higher uniformity in the extent of hydrophobic treatment in each particle or at each site of the particle surfaces (including the surfaces of the hole interiors).

A silane compound comprising a silyl group is preferable as the compound used for the hydrophobic treatment. Specific examples of compounds that can be used for the hydrophobic treatment include hexamethyldisilazane, dimethyldimethoxysilane, diethyldiethoxysilane, 1-propenylmethyldichlorosilane, propyldimethylchlorosilane, propylmethyldichlorosilane, propyltrichlorosilane, propyltriethoxysilane, propyltrimethoxysilane, styrylethyltrimethoxysilane, tetradecyltrichlorosilane, 3-thiocyanate propyltriethoxysilane, p-tolyldimethylchlorosilane, p-tolylmethyldichlorosilane, p-tolyltrichlorosilane, p-tolyltrimethoxysilane, p-tolyltriethoxysilane, di-n-propyldi-n-propoxysilane, diisopropyldi-isopropoxysilane, di-n-butyldi-n-butyloxysilane, di-sec-butyldi-sec-butyloxysilane, di-t-butyldi-t-butyloxysilane, octadecyltrichlorosilane, octadecylmethyldiethoxysilane, octadecyltriethoxysilane, octadecyltrimethoxysilane, octadecyldimethylchlorosilane, octadecylmethyldichlorosilane, octadecylmethoxydichlorosilane, 7-octenyldimethylchlorosilane, 7-octenyltrichlorosilane, 7-octenyltrimethoxysilane, octylmethyldichlorosilane, octyldimethylchlorosilane, octyltrichlorosilane, 10-undecenyldimethylchlorosilane, undecyltrichlorosilane, vinyldimethylchlorosilane, methyloctadecyldimethoxysilane, methyldodecyldiethoxysilane, methyloctadecyldimethoxysilane, methyloctadecyldiethoxysilane, n-octylmethyldimethoxysilane, n-octylmethyldiethoxysilane, triacontyldimethylchlorosilane, triacontyltrichlorosilane, methyltrimethoxysilane, methyltriethoxysilane, methyl tri-n-propoxysilane, methylisopropoxysilane, methyl-n-butyloxysilane, methyl tri-sec-butyloxysilane, methyl tri-t-butyloxysilane, ethyltrimethoxysilane, ethyltriethoxysilane, ethyl tri-n-propoxysilane, ethylisopropoxysilane, ethyl-n-butyloxysilane, ethyl tri-sec-butyloxysilane, ethyl tri-t-butyloxysilane, n-propyltrimethoxysilane, isobutyltrimethoxysilane, n-hexyltrimethoxysilane, hexadecyltrimethoxysilane, n-octyltrimethoxysilane, n-dodecyltrimethoxysilane, n-octadecyltrimethoxysilane, n-propyltriethoxysilane, isobutyltri-ethoxysilane, n-hexyltriethoxysilane, hexadecyltriethoxysilane, n-octyltriethoxysilane, n-dodecyltriethoxysilane, n-octadecyltriethoxysilane, 2-[2-(trichlorosilyl)ethyl]pyridine, 4-[2-(trichlorosilyl)ethyl]pyridine, diphenyldimethoxysilane, diphenyldiethoxysilane, 1,3-(trichlorosilylmethyl) heptacosane, dibenzyldimethoxysilane, dibenzyldiethoxysilane, phenyltrimethoxysilane, phenylmethyldimethoxysilane, phenyldimethylmethoxysilane, phenyldimethoxysilane, phenyldiethoxysilane, phenylmethyldiethoxysilane, phenyldimethylethoxysilane, benzyltriethoxysilane, benzyltrimethoxysilane, benzylmethyldimethoxysilane, benzyldimethylmethoxysilane, benzyldimethoxysilane, benzyldiethoxysilane, benzylmethyldiethoxysilane, benzyldimethylethoxysilane, benzyltriethoxysilane, dibenzyldimethoxysilane, dibenzyldiethoxysilane, 3-acetoxypropyltrimethoxysilane, 3-acryloxypropyltrimethoxysilane, allyltrimethoxysilane, allyltriethoxysilane, 4-aminobutyltriethoxysilane, (aminoethylaminomethyl)phenethyltrimethoxysilane, N-(2-aminoethyl)-3-aminopropylmethyldimethoxysilane, N-(2-aminoethyl)-3-aminopropyltrimethoxysilane, 6-(aminohexylaminopropyl)trimethoxysilane, p-aminophenyltrimethoxysilane, p-aminophenylethoxysilane, m-aminophenyltrimethoxysilane, m-aminophenylethoxysilane, 3-aminopropyltrimethoxysilane, 3-aminopropyltriethoxysilane, ω-aminoundecyltrimethoxysilane, amyltriethoxysilane, benzooxasilepinedimethylester, 5-(bicycloheptenyl)triethoxysilane, bis(2-hydroxyethyl)-3-aminopropyltriethoxysilane, 8-bromooctyltrimethoxysilane, bromophenyltrimethoxysilane, 3-bromopropyltrimethoxysilane, n-butyltrimethoxysilane, 2-chloromethyltriethoxysilane, chloromethylmethyldiethoxysilane, chloromethylmethyldiisopropoxysilane, p-(chloromethyl)phenyltrimethoxysilane, chloromethyltriethoxysilane, chlorophenyltriethoxysilane, 3-chloropropylmethyldimethoxysilane, 3-chloropropyltriethoxysilane, 3-chloropropyltrimethoxysilane, 2-(4-chlorosulfonylphenyl)ethyltrimethoxysilane, 2-cyanoethyltriethoxysilane, 2-cyanoethyltrimethoxysilane, cyanomethylphenethyltriethoxysilane, 3-cyanopropyltriethoxysilane, 2-(3-cyclohexenyl)ethyltrimethoxysilane, 2-(3-cyclohexenyl)ethyltriethoxysilane, 3-cyclohexenyltrichlorosilane, 2-(3-cyclohexenyl)ethyltrichlorosilane, 2-(3-cyclohexenyl)ethyldimethylchlorosilane, 2-(3-cyclohexenyl)ethylmethyldichlorosilane, cyclohexyldimethylchlorosilane, cyclohexylethyldimethoxysilane, cyclohexylmethyldichlorosilane, cyclohexylmethyldimethoxysilane, (cyclohexylmethyl)trichlorosilane, cyclohexyltrichlorosilane, cyclohexyltrimethoxysilane, cyclooctyltrichlorosilane, (4-cyclooctenyl)trichlorosilane, cyclopentyltrichlorosilane, cyclopentyltrimethoxysilane, 1,1-diethoxy-1-silacyclopenta-3-ene, 3-(2,4-dinitrophenylamino)propyltriethoxysilane, (dimethylchlorosilyl)methyl-7,7-dimethylnorpinane, (cyclohexylaminomethyl)methyldiethoxysilane, (3-cyclopentadienylpropyl)triethoxysilane, N,N-diethyl-3-aminopropyl)trimethoxysilane, 2-(3,4-epoxycyclohexyl)ethyltrimethoxysilane, 2-(3,4-epoxycyclohexyl)ethyltriethoxysilane, (furfuryloxymethyl)triethoxysilane, 2-hydroxy-4-(3-triethoxypropoxyl)diphenyl ketone, 3-(p-methoxyphenyl)propylmethyldichlorosilane, 3-(p-methoxyphenyl)propyltrichlorosilane, p-(methylphenethyl)methyldichlorosilane, p-(methylphenethyl)trichlorosilane, p-(methylphenethyl)dimethylchlorosilane, 3-morpholinopropyltrimethoxysilane, (3-glycidoxypropyl)methyldiethoxysilane, 3-glycidoxypropyltrimethoxysilane, 1,2,3,4,7,7,-hexachloro-6-methyldiethoxysilyl-2-norbornene, 1,2,3,4,7,7,-hexachloro-6-triethoxysilyl-2-norbornene, 3-iodopropyltrimethoxysilane, 3-isocyanate propyltriethoxysilane, (mercaptomethyl)methyldiethoxysilane, 3-mercaptopropylmethyldimethoxysilane, 3-mercaptopropyldimethoxysilane, 3-mercaptopropyltriethoxysilane, 3-methacryloxypropylmethyldiethoxysilane, 3-methacryloxypropyltrimethoxysilane, methyl{2-(3-trimethoxysilylpropylamino)ethylamino}-3-propionate, 7-octenyltrimethoxysilane, R—N-α-phenethyl-N'-triethoxysilylpropylurea, S—N-α-phenethyl-N'-triethoxysilylpropylurea, phenethyltrimethoxysilane, phenethylmethyldimethoxysilane, phenethyldimethylmethoxysilane, phenethyldimethoxysilane, phenethyldiethoxysilane, phenethylmethyldiethoxysilane, phenethyldimethylethoxysilane, phenethyltriethoxysilane, (3-phenylpropyl)dimethylchlorosilane, (3-phenylpropyl)methyldichlorosilane, N-phenylaminopropyltrimethoxysilane, N-(triethoxysilylpropyl)dansylamide, N-(3-triethoxysilylpropyl)-4,5-dihydroimidazole, 2-(triethoxysilylethyl)-5-(chloroacetoxy)bicycloheptane, (S)—N-triethoxysilylpropyl-O-menthocarbamate, 3-(triethoxysilylpropyl)-p-nitrobenzamide, 3-(triethoxysilyl)propylsuccinic anhydride, N-[5-(trimethoxysilyl)-2-aza-1-oxopentyl]caprolactam, 2-(trimethoxysilylethyl)pyridine, N-(trimethoxysilylethyl)benzyl-N,N,N-trimethylammonium chloride, phenylvinyldiethoxysilane, 3-thiocyanate propyltriethoxysilane, (tridecafluoro-1,1,2,2,-tetrahydrooctyl)triethoxysilane, N-{3-(triethoxysilyl)propyl}phthalamate, (3,3,3-trifluoropropyl)methyldimethoxysilane, (3,3,3-trifluoropropyl)trimethoxysilane, 1-trimethoxysilyl-2-(chloromethyl)phenylethane, 2-(trimethoxysilyl)ethylphenylsulfonyl azide, β-trimethoxysilylethyl-2-pyridine, trimethoxysilylpropyldiethylenetriamine, N-(3-trimethoxysilylpropyl)pyrrole, N-trimethoxysilylpropyl-N,N,N-tributylammonium bromide, N-trimethoxysilylpropyl-N,N,N-tributylammonium chloride, N-trimethoxysilylpropyl-N,N,N-trimethylammonium chloride, vinylmethyldiethoxysilane, vinyltriethoxysilane, vinyltrimethoxysilane, vinylmethyldimethoxysilane, vinyldimethylmethoxysilane, vinyldimethylethoxysilane, vinylmethyldichlorosilane, vinylphenyldichlorosilane, vinylphenyldiethoxysilane, vinylphenyldimethylsilane, vinylphenylmethylchlorosilane, vinyltriphenoxysilane, vinyltris-t-butoxysilane, adamantylethyltrichlorosilane, allylphenyltrichlorosilane, (aminoethylaminomethyl)phenethyltrimethoxysilane, 3-aminophenoxydimethylvinylsilane, phenyltrichlorosilane, phenyldimethylchlorosilane, phenylmethyldichlorosilane, benzyltrichlorosilane, benzyldimethylchlorosilane, benzylmethyldichlorosilane, phenethyldiisopropylchlorosilane, phenethyltrichlorosilane, phenethyldimethylchlorosilane, phenethylmethyldichlorosilane, 5-(bicycloheptenyl)trichlorosilane, 5-(bicycloheptenyl)triethoxysilane, 2-(bicycloheptyl)dimethylchlorosilane, 2-(bicycloheptyl)trichlorosilane, 1,4-bis(trimethoxysilylethyl)benzene, bromophenyltrichlorosilane, 3-phenoxypropyldimethylchlorosilane, 3-phenoxypropyltrichlorosilane, t-butylphenylchlorosilane, t-butylphenylmethoxysilane, t-butylphenyldichlorosilane, p-(t-butyl)phenethyldimethylchlorosilane, p-(t-butyl)phenethyltrichlorosilane, 1,3-(chlorodimethylsilylmethyl)heptacosane, ((chloromethyl)phenylethyl)dimethylchlorosilane, ((chloromethyl)phenylethyl)methyldichlorosilane, ((chloromethyl)phenylethyl)trichlorosilane, ((chloromethyl)phenylethyl)trimethoxysilane, chlorophenyltrichlorosilane, 2-cyanoethyltrichlorosilane, 2-cyanoethylmethyldichlorosilane, 3-cyanopropylmethyldimethoxysilane, 3-cyanopropylmethyldichlorosilane, 3-cyanopropylmethyldichlorosilane, 3-cyanopropyldimethylethoxysilane, 3-cyanopropylmethyldichlorosilane, 3-cyanopropyltrichlorosilane, and fluorinated alkylsilanes; it would also be possible to use one species selected from these or a combination of two or more species selected from these.

Of these, it is preferable to use hexamethyldisilazane for the hydrophobic treatment. This makes it possible to make the particles even more hydrophobic. This also makes it possible to easily and reliably impart a higher uniformity in the extent of hydrophobic treatment in each particle or at each site of the particle surfaces (including the surfaces of the hole interiors).

In a case where a hydrophobic treatment in which a silane compound is used is conducted in a liquid phase, then immersing the particles needing to undergo the hydrophobic treatment in a solution that contains the silane compound makes it possible to cause the desired reaction to proceed favorably and makes it possible to form a chemical adsorption film of the silane compound.

In a case where a hydrophobic treatment in which a silane compound is used is conducted in a gas phase, then exposing the particles 63 needing to undergo the hydrophobic treatment to a vapor of the silane compound makes it possible to cause the desired reaction to proceed favorably and makes it possible to form a chemical adsorption film of the silane compound.

Though not particularly limited, the mean particle size of the particles 63 constituting the three-dimensional shaping powder is preferably 1 to 25 μm, more preferably 1 to 15 μm. This makes it possible to give the three-dimensional shaped object 1 particularly excellent mechanical strength, and also makes it possible to more effectively prevent the occurrence of an undesirable unevenness in the three-dimensional shaped object 1 being manufactured or the like, and to give the three-dimensional shaped object 1 particularly excellent dimensional accuracy. This also makes it possible to impart particularly excellent fluidity to the three-dimensional shaping powder and particularly excellent fluidity to the three-dimensional shaping composition that comprises the three-dimensional shaping powder, and possible to give the three-dimensional shaped object particularly excellent productivity. In the invention, the "mean particle size" refers to the mean particle size based on volume, and can be found by, for example, adding methanol to a sample and dispersing same for three minutes with an ultrasonic disperser to obtain a dispersion solution and then measuring the dispersion solution with a Coulter counter particle size distribution measuring instrument (TA-II type made by Coulter Electronics Inc.) using a 50-μm aperture.

The Dmax of the particles 63 constituting the three-dimensional shaping powder is preferably 3 to 40 μm, more preferably 5 to 30 μm. This makes it possible to give the three-dimensional shaped object 1 particularly excellent mechanical strength, and also makes it possible to more effectively prevent the occurrence of an undesirable unevenness in the three-dimensional shaped object 1 being manufactured or the like, and to give the three-dimensional shaped object 1 particularly excellent dimensional accuracy. This also makes it possible to impart particularly excellent fluidity to the three-dimensional shaping powder and particularly excellent fluidity to the three-dimensional shaping composition that comprises the three-dimensional shaping powder, and possible to give the three-dimensional shaped object 1 particularly excellent productivity. Scattering of light by the particles 63 at the surface of the three-dimensional shaped object 1 being manufactured can also be more effectively prevented.

In the case where the particles 63 are porous particles, then the porosity of the porous particles is preferably 50% or higher, more preferably 55% to 90%. This makes it possible to cause there to be ample space (holes) for the curable resin to enter in and possible to give the porous particles themselves excellent mechanical strength, and consequently makes it possible to impart particularly excellent mechanical strength to the three-dimensional shaped object 1 obtained when the binding resin penetrates into the holes. In the invention, the "porosity" of the particles refers to the proportion (volume fraction) of holes present in the interior of the particles versus the apparent volume of the particles, and is a value represented by $\{(\rho 0-\rho)/\rho 0\} \times 100$, where $\rho$ (g/cm$^3$) is the density of the particles and $\rho 0$ (g/cm$^3$) is the true density of the constituent material of the particles.

In the case where the particles 63 are porous particles, then the mean hole size (pore diameter) of the porous particles is preferably 10 nm or greater, more preferably 50 to 300 nm. This makes it possible to impart particularly excellent mechanical strength to the three-dimensional shaped object 1 that is ultimately obtained. In a case where a colored ink comprising a pigment is used in the manufacture of the three-dimensional shaped object 1, then the pigment can be favorably retained inside the holes of the porous particles. For this reason, undesirable spreading of the pigment can be prevented, and a high-definition image can be more reliably formed.

The particles 63 constituting the three-dimensional shaping powder may have any shape, but preferably have a spherical shape. This makes it possible to give the three-dimensional shaping powder particularly excellent fluidity and give the three-dimensional shaping composition comprising the three-dimensional shaping powder particularly excellent fluidity, and to give the three-dimensional shaped object 1 particularly excellent productivity, and also makes it possible to more effectively prevent the occurrence of an undesirable unevenness in the three-dimensional shaped object 1 being manufactured or the like, and to give the three-dimensional shaped object 1 particularly excellent dimensional accuracy.

The three-dimensional shaping powder may be one that comprises a plurality of different kinds of particles with which such conditions as described above (for example, the constituent materials of the particles, the type of hydrophobic treatment, and the like) are mutually different.

The void ratio of the three-dimensional shaping powder is preferably 70% to 98%, more preferably 75% to 97.7%. This makes it possible to give the three-dimensional shaped object particularly excellent mechanical strength. Additionally, this makes it possible to give the three-dimensional shaping powder particularly excellent fluidity and give the three-dimensional shaping composition comprising the three-dimensional shaping powder particularly excellent fluidity, and to give the three-dimensional shaped object 1 particularly excellent productivity, and also makes it possible to more effectively prevent the occurrence of an undesirable unevenness in the three-dimensional shaped object 1 being manufactured or the like, and to give the three-dimensional shaped object 1 particularly excellent dimensional accuracy. In the invention, the "void ratio" of the three-dimensional shaping powder refers to the ratio of the sum of the volume of the holes possessed by all particles constituting the three-dimensional shaping powder and the volume of the voids present between the particles versus the volume of a container of a predetermined volume (for example, 100 mL) in a case where the container is filled with the three-dimensional shaping powder, and is a value presented by $\{(P0-P)/P0\} \times 100$, where $P$ (g/cm$^3$) is the bulk density of the three-dimensional shaping powder an $P0$ (g/cm$^3$) is the true density of the constituent material of the three-dimensional shaping powder.

The rate of content of the three-dimensional shaping powder in the three-dimensional shaping composition is prefer-ably 10 mass % to 90 mass %, more preferably 15 mass % to 58 mass %. This makes it possible to impart particularly excellent mechanical strength to the three-dimensional shaped object 1 that is ultimately obtained, while also imparting ample fluidity to the three-dimensional shaping composition.

Water-Soluble Resin

The three-dimensional shaping composition is one that comprises the water-soluble resin 64 along with the plurality of particles 63. Comprising the water-soluble resin 64 makes it possible to bind (temporarily fix) the particles 63 to one another (see FIG. 2) and to effectively prevent any undesirable scattering of the particles 63 and the like. This makes it possible to achieve improvements in safety for workers and in dimensional accuracy of a three-dimensional shaped object 1 being manufactured.

In the invention, it suffices for the "water-soluble resin" to refer to one that is at least partially soluble in water, but, for example, the solubility to water (mass that is soluble in 100 g of water) at 25° C. is preferably 5 (g/100 g water) or higher, more preferably 10 (g/100 g water) or higher.

Examples of the water-soluble resin include synthetic polymers such as polyvinyl alcohol (PVA), polyvinylpyrrolidone (PVP), sodium polyacrylate, polyacrylamide, modified polyamide, polyethylenimine, and polyethylene oxide; natural polymers such as corn starch, mannan, pectin, agar, alginic acid, dextran, glue, and gelatin; and semisynthetic polymers such as carboxymethyl cellulose, hydroxyethyl cellulose, oxidized starch and modified starch; it would also be possible to use one species selected from these or a combination of two or more species selected from these.

Examples of water-soluble resin products include methylcellulose (Shin-Etsu Chemical: trade name "Metolose SM-15"), hydroxyethyl cellulose (Fuji Chemical Co.: trade name "AL-15"), hydroxypropyl cellulose (Nippon Soda: trade name "HPC-M"), carboxymethyl cellulose (manufactured by Nichirin Chemical: trade name "CMC-30"), sodium starch phosphate ester (I) (manufactured by Matsutani Chemical Industry Co. Ltd.: trade name "Hosuta 5100"), polyvinylpyrrolidone (manufactured by Tokyo Chemical Industry: trade name "PVP K-90"), methyl vinyl ether/maleic anhydride copolymer (manufactured by GAF Corp; trade name "AN-139"), polyacrylamide (manufactured by Wako Pure Chemical Industries), modified polyamide (modified nylon) (manufactured by Toray Industries: trade name "AQnylon"), polyethyleneoxide (manufactured by Seitetsu Kagaku Co., Ltd.: trade name "PEO-1", Meisei Chemical Works; trade name: "Alkox"), ethyleneoxide/propyleneoxide random copolymer (manufactured by Meisei Chemical Works: trade name "Alkox EP"), sodium polyacrylate (manufactured by Wako Pure Chemical Industries), carboxyvinyl polymer/cross-linked water-soluble acrylic resin (manufactured by Sumitomo Seika Chemicals: trade name "Aqupec").

Of these, a case where the water-soluble resin 64 is a polyvinyl alcohol makes it possible to give the three-dimensional shaped object 1 particularly excellent mechanical strength. Also, adjusting the degree of saponification and degree of polymerization makes it possible to more favorably control the properties of the water-soluble resin 64 (for example, the water solubility, water resistance, and the like) and the properties of the three-dimensional shaping composition (for example, the viscosity, the fixing force of the particles 63, the wetting properties, and the like). For this reason, the manufacture of a diverse range of three-dimensional shaped objects 1 can be accommodated. A polyvinyl alcohol also offers lower cost and more stable supply among the variety of water-soluble resins. For this reason, the three-dimensional shaped object 1 can be stably manufactured while production costs are also being kept low.

In a case where the water-soluble resin 64 is one that comprises a polyvinyl alcohol, then the degree of saponification of that polyvinyl alcohol is preferably 85 to 90. This makes it possible to curb any decrease in the solubility of the polyvinyl alcohol to water. Therefore, in the case where the three-dimensional shaping composition is one that contains water, any decrease in the adhesion between the adjacent unit layers 7 can be more effectively curbed.

In the case where the water-soluble resin 64 is one that comprises a polyvinyl alcohol, then the degree of polymerization of that polyvinyl alcohol is preferably 300 to 1,000. This makes it possible to impart particularly excellent mechanical strength to each of the unit layers 7 and impart particularly excellent adhesion between the adjacent unit layers 7 in the case where the three-dimensional shaping composition is one that comprises water.

The following effects are obtained in a case where the water-soluble resin 64 is polyvinylpyrrolidone (PVP). Namely, polyvinylpyrrolidone has excellent adhesion to a variety of materials such as glasses, metals, and plastics, and therefore it is possible to impart particularly excellent strength and stability of shape to the portions of the layers 6 where the inks are not applied, and to impart particularly excellent dimensional accuracy to the three-dimensional shaped object 1 that is ultimately obtained. Also, polyvinylpyrrolidone exhibits high solubility to a variety of organic solvents, and therefore in a case where the three-dimensional shaping composition comprises an organic solvent, the three-dimensional shaping composition can be given particularly excellent fluidity, layers 6 with which any undesirable variance in the thickness has been more effectively prevented can be formed, and the three-dimensional shaped object 1 that is ultimately obtained can be given particularly excellent dimensional accuracy. Moreover, polyvinylpyrrolidone exhibits high solubility to water, as well, and therefore it is possible to easily and reliably remove any of the particles 63 constituting each of the layers 6 that have not been bound by the binding agent 44 in the unbound particle removal step (after the end of shaping). In addition, polyvinylpyrrolidone has an appropriate degree of affinity to the three-dimensional shaping powder, and therefore such entry into the holes 611 as described early is unlikely to occur adequately but the wettability to the surface of the particles 63 is comparatively high. For this reason, the function of temporary fixing as described above can be more effectively exerted. Polyvinylpyrrolidone also has excellent affinity with a variety of colorants, and therefore in a case where an ink 4 that comprises a colorant is used in the ink application step, the colorant can be effectively prevented from spreading undesirably. Moreover, polyvinylpyrrolidone has an antistatic function, and therefore in a case where a powder that is not pasted is used as the three-dimensional shaping composition in the layer formation step, scattering of the powder can be effectively prevented. In a case where a composition that is pasted is used as the three-dimensional shaping composition in the layer formation step, then where the three-dimensional shaping composition paste comprises polyvinylpyrrolidone, bubbles can be effectively prevented from getting trapped in the three-dimensional shaping composition, and defects caused by trapping of bubbles can be more effectively prevented from occurring in the layer formation step.

In a case where the water-soluble resin 64 is one that comprises polyvinylpyrrolidone, then the weight-average molecular weight of that polyvinylpyrrolidone is preferably 10,000 to 1,700,000, more preferably 30,000 to 1,500,000. This makes it possible to more effectively exert the functions described above.

In the three-dimensional shaping composition, the water-soluble resin 64 preferably takes a liquid state (for example, a dissolved state, a molten state, or the like) in at leas the layer formation step. This makes it possible to easily and reliably impart high uniformity of thickness to the layers 6 that are formed using the three-dimensional shaping composition.

The rate of content of the water-soluble resin 64 in the three-dimensional shaping composition is preferably 15 vol % or less, more preferably 2 vol % to 5 vol %, relative to the bulk volume of the three-dimensional shaping powder. This makes it possible to ensure broader voids for the inks 4 to penetrate into while also amply exerting the functions of the water-soluble resin 64 as described above, and possible to give the three-dimensional shaped object 1 particularly excellent mechanical strength.

Solvents

The three-dimensional shaping composition may be one that comprises a solvent, in addition to the water-soluble resin 64 and the three-dimensional shaping powder described above. This makes it possible to give the three-dimensional shaping composition particularly excellent fluidity and possible to give the three-dimensional shaped object 1 particularly excellent productivity.

Preferably, the solvent is one that dissolves the water-soluble resin 64. This makes it possible to impart favorable fluidity to the three-dimensional shaping composition, and makes it possible to more effectively prevent any undesirable variance in the thickness of the layers 6 that are formed using the three-dimensional shaping composition. Also, upon formation of the layers 6 in a state where the solvent has been removed, the water-soluble resin can be attached to the particles 63 at higher uniformity across the whole of the layers 6, and an undesirable unevenness of composition can be more effectively prevented from occurring. For this reason, any undesirable variance in the mechanical strength at each of the sites of the three-dimensional shaped object 1 that is ultimately obtained can be more effectively prevented from occurring, and the three-dimensional shaped object 1 can be given a higher reliability.

Examples of solvents constituting the three-dimensional shaping composition can include water; alcohol solvents such as methanol, ethanol, and isopropanol; ketone-based solvents such as methylethyl ketone and acetone; glycol ethers such as ethylene glycol monoethyl ether and ethylene glycol monobutyl ether; glycol ether acetates such as propylene glycol 1-monomethyl ether 2-acetate and propylene glycol 1-monoethyl ether 2-acetate; polyethylene glycol, and polypropylene glycol; it would also be possible to use one species selected from these or a combination of two or more species selected from these.

Of these, the three-dimensional shaping composition preferably is one that comprises water. This makes it possible to more reliably dissolve the water-soluble resin 64, and makes it possible to impart a particularly excellent fluidity to the three-dimensional shaping composition and a particularly excellent uniformity of composition to the layers 6 that are formed using the three-dimensional shaping composition. Water is also easily removed after the formation of the layers 6, and is unlikely to have any adverse effects even in a case where some water remains in the three-dimensional shaped object 1. Water is additionally advantageous in terms of being safe for the human body and in terms of environmental issues.

In a case where the three-dimensional shaping composition is one that comprises a solvent, then the rate of content of the solvent in the three-dimensional shaping composition is preferably 5 mass % to 75 mass %, more preferably 35 mass % to 70 mass %. This causes the effects from comprising the solvent as described above to be more prominently exerted, and also makes it possible to easily remove the solvent quickly during the steps of manufacturing the three-dimensional shaped object 1, and therefore is advantageous in terms of improving the productivity of the three-dimensional shaped object 1.

In particular, in a case where the three-dimensional shaping composition contains water as a solvent, the rate of content of the water in the three-dimensional shaping composition is preferably 20 mass % to 73 mass %, more preferably 50 mass % to 70 mass %. This causes the effects described above to be more prominently exerted.

Other Components

The three-dimensional shaping composition may comprise components other than what is described above. Examples of such components could include a polymerization initiator, a polymerization accelerator, a penetration enhancer, a wetting agent (moisturizer), a fixing agent, an anti-mildew agent, an antioxidant, an ultraviolet absorber, a chelating agent, or a pH adjusting agent.

4. Inks

Next, the inks used in the method of manufacturing a three-dimensional shaped object in the invention shall be described in greater detail.

Binding Agent

The inks 4 comprise at least the binding agent 44.

The binding agent 44 is a component provided with a function for binding the particles 63 by being cured.

Though not particularly limited, the binding agent 44 of such description preferably is hydrophobic (lipophilic). This makes it possible to create higher affinity between the inks 4 and the particles 63 in a case where, for example, the particles 63 that are used are ones that have undergone a hydrophobic treatment, and causes application of the inks 4 to the layers 6 to enable the inks 4 to favorably penetrate into the holes 611 of the particles 63. As a result, the anchoring effect by the binding agent 44 is favorably exerted and the three-dimensional shaped object 1 that is ultimately obtained can be given excellent mechanical strength. In the invention, it suffices for a hydrophobic curable resin to have amply low affinity to water, but preferably, for example, the solubility to water at 25° C. is 1 (g/100 g water) or lower.

Examples of the binding agent 44 could include a thermoplastic resin; a thermocurable resin; a variety of photocurable resins such as a visible light-curable resin (the narrow definition of a photocurable resin) that is cured by light in the visible light range, an ultraviolet curable resin, or an infrared curable resin; or an X-ray curable resin; it would also be possible to use one species selected from these or a combination of two or more species selected from these. Of these, it is preferable for the binding agent 44 to be a curable resin, from the standpoint of the mechanical strength of the resulting three-dimensional shaped object 1, the productivity of the three-dimensional shaped object 1, and so forth. Of the variety of curable resins, it is particularly preferable for the binding agent 44 to be an ultraviolet curable resin (polymerizable compound) from the standpoint of the mechanical strength of the resulting three-dimensional shaped object 1, the productivity of the three-dimensional shaped object 1, the storage stability of the inks 4, and so forth.

Preferably used as an ultraviolet curable resin (polymerizable compound) is one with which an addition polymerization or ring-opening polymerization is initiated by radical species or cation species or the like produced from a photopolymerization initiator by irradiation with ultraviolet rays, thus creating a polymer. Manners of polymerization in addition polymerization include radical, cationic, anionic, metathesis, and coordination polymerization. Manners of polymerization in ring-opening polymerization include cationic, anionic, radical metathesis, and coordination polymerization.

Examples of addition polymerizable compounds include compounds that have at least one ethylenically unsaturated double bond. Compounds that have at least one, preferably two terminal ethylenically unsaturated bond can be preferably used as an addition polymerizable compound.

Ethylenically unsaturated polymerizable compounds have the chemical form of monofunctional polymerizable compounds and polyfunctional polymerizable compounds, or mixtures thereof. Examples of monofunctional polymerizable compounds include unsaturated carboxylic acids (for example, acrylic acid, methacrylic acid, itaconic acid, crotonic acid, isocrotonic acid, maleic acid, and the like) or esters or amides thereof. An ester of an unsaturated carboxylic acid and an aliphatic polyhydric alcohol compound or an amide of an unsaturated carboxylic acid and aliphatic polyvalent amine compound is used as a polyfunctional polymerizable compound.

It would also be possible to use: a product of an addition reaction between an isocyanate or an epoxy and an unsaturated carboxylic acid ester or amide that has a nucleophilic substituent such as hydroxyl group, an amino group, or a mercapto group; a product of a dehydration condensation reaction with a carboxylic acid; or the like. It would also be possible to use: the product of an addition reaction between an unsaturated carboxylic acid ester or amide having an electrophilic substituent group such as an isocyanate group or an epoxy group and an alcohol, amine, or thiol; or the product of a substitution reaction between an unsaturated carboxylic acid ester or amide having a leaving group substituent such as a halogen group or a tosyloxy group and an alcohol, amine, or thiol.

A (meth)acrylic acid ester is representative as a specific example of a radical polymerizable compound that is the ester of an unsaturated carboxylic acid and an aliphatic polyhydric alcohol compound; either a monofunctional one or a polyfunctional one could be used.

Specific examples of monofunctional (meth)acrylates include tolyloxyethyl (meth)acrylate, phenyloxyethyl (meth) acrylate, cyclohexyl (meth)acrylate, ethyl (meth)acrylate, methyl (meth)acrylate, isobornyl (meth)acrylate, and tetrahydrofurfuryl (meth)acrylate.

Specific examples of bifunctional (meth)acrylates include ethylene glycol di(meth)acrylate, triethylene glycol di(meth) acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, and dipentaerythritol di(meth)acrylate.

Specific examples of trifunctional (meth)acrylates include trimethylol propane tri(meth)acrylate, trimethylol ethane tri (meth)acrylate, trimethylolpropane alkylene oxide-modified tri(meth)acrylate, pentaerythritol tri(meth)acrylate, dipentaerythritol tri(meth)acrylate, trimethylol propane tri((meth) acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylol propane tri (meth)acrylate, and sorbitol tri(meth)acrylate.

Specific examples of tetrafunctional (meth)acrylates include pentaerythritol tetra(meth)acrylate, sorbitol tetra (meth)acrylate, ditrimethylol propane tetra(meth)acrylate, propionic acid dipentaerythritol tetra(meth)acrylate, and ethoxylated pentaerythritol tetra(meth)acrylate.

Specific examples of pentafunctional (meth)acrylates) include sorbitol penta(meth)acrylate, and dipentaerythritol penta(meth)acrylate.

Specific examples of hexafuncional (meth)acrylates include dipentaerythritol hexa(meth)acrylate, sorbitol hexa(meth)acrylate, phosphazene alkylene oxide-modified hexa(meth)acrylate, and captolactone-modified dipentaerythritol hexa(meth)acrylate.

Examples of polymerizable compounds other than (meth) acrylates include itaconic acid esters, crotonic acid esters, isocrotonic acid esters, and maleic acid esters.

Examples of itaconic acid esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic acid esters include ethylene glycol dicrotonate, tetramethylene glycol dicrotonate, pentaerythritol dicrotonate, and sorbitol tetradicrotonate.

Examples of isocrotonic acid esters include ethylene glycol diisocrotonate, pentaerythritol diisocrotonate, and sorbitol tetraisocrotonate.

Examples of maleic acid esters include ethylene glycol dimaleate, triethylene glycol dimaleate, pentaerythritol dimaleate, and sorbitol tetramaleate.

Examples of other esters that can be used also include: the aliphatic alcohol esters disclosed in Japanese Examined Patent Publication 46-27926, Japanese Examined Patent Publication 51-47334, and Japanese Unexamined Patent Publication 57-196231; those having an aromatic backbone disclosed in Japanese Unexamined Patent Publication 59-5240, Japanese Unexamined Patent Publication 59-5241, and Japanese Unexamined Patent Publication 2-226149; and the one containing an amino group disclosed in Japanese Unexamined Patent Publication 1-165613.

Specific examples of monomers of amides of unsaturated carboxylic acids and aliphatic polyvalent amine compounds include methylene bisacrylamide, methylenebismethacrylamide, 1,6-hexamethylene bisacrylamide, 1,6-hexamethylene bismethacrylamide, diethylene triamine trisacrylamide, xylylene bisacrylamide, and xylylene bismethacrylamide.

Another example of a preferable amide monomers would be the one having a cyclohexylene structure disclosed in Japanese Examined Patent Publication 54-21726.

Urethane-based addition polymerizable compounds manufactured using an addition reaction between an isocyanate and a hydroxyl group are also favorable, and a specific example thereof could be a vinyl urethane compound containing two or more polymerizable vinyl groups in a molecule obtained by adding a vinyl monomer containing a hydroxyl group represented in formula (1) below to a polyisocyanate compound having two or more isocyanate groups in one molecule, as is disclosed in Japanese Examined Patent Publication 48-41708.

$$CH_2=C(R^1)COOCH_2CH(R^2)OH \qquad (1)$$

(where, in formula (1), $R^1$ and $R^2$ each independently represent an H or a $CH^3$.)

In the invention, a cationic ring-opening polymerizable compound having one or more cyclic ether groups such as an epoxy group or an oxetane group in the molecule can be favorably used as an ultraviolet curable resin (polymerizable resin).

Examples of cationic polymerizable compounds include curable compounds comprising a ring-opening polymerizable group, among which heterocyclic group-containing curable compounds are particularly preferable. Examples of such curable compounds include an epoxy derivative, an oxetane derivative, a tetrahydrofuran derivative, a cyclic lactone derivative, a cyclic carbonate derivative, an oxazoline derivative, or other such cyclic imino ethers, or vinyl ethers; of these, epoxy derivatives, oxetane derivatives, and vinyl ethers are preferable.

Examples of preferable epoxy derivatives include monofunctional glycidyl ethers, polyfunctional glycidyl ethers, monofunctional alicyclic epoxies, and polyfunctional alicyclic epoxies.

Specific compounds for glycidyl ethers can be illustratively exemplified by diglycidyl ethers, (for example, ethylene glycol diglycidyl ether, bisphenol A diglycidyl ether, and the like), trifunctional or higher glycidyl ethers (for example, trimethylol ethane triglycidyl ether, trimethylol propane triglycidyl ether, glycerol triglycidyl ether, triglycidyl trishydroxyethyl isocyanurate, or the like), tetrafunctional or higher glycidyl ethers (for example, sorbitol tetraglycidyl ether, pentaerythritol tetraglycyl ether, cresol novolac resin polyglycidyl ether, phenolnovolac resin polyglycidyl ether, and the like), alicyclic epoxies (for example, Celloxide 2021P, Celloxide 2081, Epolead GT-301, and Epolead GT-401 (Daicel Chemical Industries)), EHPE (Daicel Chemical Industries), phenol novolac resin polycyclohexyl epoxy methyl ether or the like), and oxetanes (for example, OX-SQ, PNOX-1009 (Toagosei), and the like).

As a polymerizable compound, an alicyclic epoxy derivative could be preferably used. An "alicyclic epoxy group" is a term of a moiety obtained when a double bond of a cycloalkene group such as a cyclopentene group or cyclohexene group is epoxidized with a suitable oxidizing agent such as hydrogen peroxide or a peroxy acid.

Preferably alicyclic epoxy compounds include polyfunctional alicyclic epoxies having two or more cyclohexene oxide groups or cyclopentene oxide groups in one molecule. Specific examples of alicyclic epoxy compounds include 4-vinylcyclohexene dioxide, (3,4-epoxycyclohexyl)methyl-3,4-epoxycyclohexyl carboxylate, di(3,4-epoxycyclohexyl) adipate, di(3,4-epoxycyclohexylmethyl) adipate, bis(2,3-epoxycyclopentyl) ether, di(2,3-epoxy-6-methylcyclohexylmethyl) adipate, and dicyclopentadiene dioxide.

A glycidyl compound having a normal epoxy group without an alicyclic structure in the molecule could be used either independently or in combination with an aforementioned alicyclic epoxy compound.

Examples of such normal glycidyl compounds could include glycidyl ether compounds and glycidyl ester compounds, but it is preferable to use a glycidyl ether compound in combination Specific examples of glycidyl ether compounds include: an aromatic glycidyl ether compound such as 1,3-bis(2,3-epoxypropyloxy)benzene, a bisphenol A epoxy resin, a bisphenol F epoxy resin, a phenol novolac epoxy resin, a cresol novolac epoxy resin, and a trisphenol methane epoxy resin; and an aliphatic glycidyl ether compound such as 1,4-butanediol glycidyl ether, glycerol triglycidyl ether, propylene glycol diglycidyl ether, and trimethylol propane tritriglycidyl ether. Examples of a glycidyl ester could include a glycidyl ether of linoleic acid dimers.

As a polymerizable compound, it would be possible to use a compound that has an oxetanyl group, which is a four-membered cyclic ether (this compound also being called simple an "oxetane compound" below). An oxetanyl group-containing compound is a compound that has one or more oxetanyl groups in one molecule.

The rate of content of the binding agent 44 in the inks 4 is preferably 80 mass % or more, more preferably 85 mass % or more. This makes it possible to impart particularly excellent mechanical strength to the three-dimensional shaped object 1 that is ultimately obtained.

Other Components

The inks 4 may also be ones that comprise components other than those described above. Examples of such components can include a variety of colorants such as a pigment or a dye, a dispersant, a surfactant, a polymerization initiator, a polymerization accelerator, a solvent, a penetration enhancer, a wetting agent (moisturizer), a fixing agent, an anti-mildew agent, a preservative, an antioxidant, an ultraviolet absorber, a chelating agent, a pH adjusting agent, a thickener, a filler, an aggregation inhibitor, or a defoamer.

In particular, when the inks 4 comprise a colorant, this makes it possible to obtain a three-dimensional shaped object 1 that has been colored so as to correspond to the color of the colorant.

In particular, comprising a pigment as a colorant makes it possible to impart favorable light resistance to the inks 4 and the three-dimensional shaped object 1. For the pigment, it would be possible to use inorganic pigments and organic pigments.

Examples of inorganic pigments include: carbon blacks (CI Pigment Black 7) such as furnace black, lamp black, acetylene black and channel black; iron oxide, or titanium oxide; it would also be possible to use one species selected from these or a combination of two or more species selected from these.

Of these inorganic pigments, titanium oxide is preferable because of the preferable white color exhibited thereby.

Examples of inorganic pigments include: an azo pigment such as an insoluble azo pigment, a condensed azo pigment, azo lake, or chelate azo pigment; a polycyclic pigment such as a phthalocyanine pigment, a perylene or perynone pigment, an anthraquinone pigment, a quinacridone pigment, a dioxane pigment, a thioindigo pigment, an isoindolinone pigment, or a quinophthalone pigment; dye chelate (for example, a basic dye chelate or an acidic dye chelate, or the like); a color lake (a basic dye lake or an acidic dye lake); a nitro pigment; a nitroso pigment; aniline black; or a daylight fluorescent pigment; it would also be possible to use one species selected from these or a combination of two or more species selected from these.

More specifically, examples of carbon blacks that are used as pigments for the color black include: No. 2300, No. 900, MCF88, No. 33, No. 40, No. 45, No. 52, MA7, MA8, MA100, No. 2200B, and the like (Mitsubishi Chemical); Raven 5750, Raven 5250, Raven 5000, Raven 3500, Raven 1255, Raven 700, and the like (Carbon Columbia); Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (Cabot Japan); and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 (Degussa).

Examples of pigments for the color white include CI Pigment White 6, 8, and 21.

Examples of pigments for the color yellow include CI Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of pigments for the color magenta include CI Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, or CI Pigment Violet 19, 23, 32, 33, 36, 38, 43, and 50.

Examples of pigments for the color cyan include CI Pigment Blue 1, 2, 3, 15, 15:1, 15:2, 15:3, 15:34, 15:4, 16, 18, 22, 25, 60, 65, 66, and CI Vat Blue 4 and 60.

Examples of pigments other than those mentioned above include CI Pigment Green 7 and 10, CI Pigment Brown 3, 5, 25, and 26, and CI Pigment Orange 1, 2, 5, 7, 13, 14, 15, 16, 24, 34, 36, 38, 40, 43, and 63.

In a case where the inks 4 are ones that comprise pigments, then the mean particle size of those pigments is preferably 300 nm or less, more preferably 50 nm to 250 nm. This makes it possible to impart particularly excellent discharge stability to the inks 4 and particularly excellent dispersion stability to the pigments in the inks 4, and also makes it possible to form images of better image quality.

In a case where the inks 4 comprise pigments and the particles 63 are porous, then where d1 (nm) is the mean hole size of the particles 63 and d2 (nm) is the mean particle size of the pigments, the relationship $d1/d2>1$ is preferably satisfied; more preferably, the relationship $1.1 \leq d1/d2 \leq 6$ is satisfied. Satisfying such relationships makes it possible to favorably retain the pigments in the holes of the particles 63. For this reason, undesirable spreading of the pigment can be prevented, and a high-definition image can be more reliably formed.

Examples of dyes include an acidic dye, a direct dye, a reactive dye, or a basic dye; it would also be possible to use one species selected from these or a combination of two or more species selected from these.

Specific examples of dyes include CI Acid Yellow 17, 23, 42, 44, 79, and 142, CI Acid Red 52, 80, 82, 249, 254, and 289, CI Acid Blue 9, 45, and 249, CI Acid Black 1, 2, 24, and 94, CI Food Black 1 and 2, CI Direct Yellow 1, 12, 24, 33, 50, 55, 58, 86, 132, 142, 144, and 173, CI Direct Red 1, 4, 9, 80, 81, 225, and 227, CI Direct Blue 1, 2, 15, 71, 86, 87, 98, 165, 199, and 202, CI Direct Black 19, 38, 51, 71, 154, 168, 171, and 195, CI Reactive Red 14, 32, 55, 79, and 249, and CI Reactive Black 3, 4, and 35.

In a case where the inks 4 comprise colorants, then the rate of content of the colorants in the inks 4 is preferably 1 mass % to 20 mass %. This produces particularly excellent masking and color reproducibility.

In particular, in a case where an ink 4 comprises titanium oxide as a colorant, then the rate of content of the titanium oxide in that ink 4 is preferably 12 mass % to 18 mass %, more preferably 14 mass % to 16 mass %. This produces particularly excellent masking.

In a case where the inks 4 comprise pigments, then the pigments can be given more favorable dispersibility when a dispersing agent is also contained. As a result, any partial decline in the mechanical strength due to pigment deviation can be more effectively curbed.

Though not particularly limited, examples of dispersing agents include dispersing agents that are commonly used to prepare pigment dispersions, such as polymeric dispersing agents. Specific examples of polymeric dispersing agents include those composed mainly of one or more species from among polyoxyalkylene polyalkylene polyamine, vinyl-based polymers and copolymers, acrylic polymers and copolymers, polyester, polyamide, polyimide, polyurethane, amino-based polymers, silicon-containing polymers, sulfur-containing polymers, fluorine-containing polymers, and epoxy resins. Examples of commercially available forms of polymeric dispersing agents include Ajinomoto Fine-Techno's Ajisper series, the Solsperse series (Solsperse 36000 and the like) available from Noveon, BYK's Disperbyk series, and Kusumoto Chemicals' Disparlon series.

When the inks 4 comprise a surfactant, the three-dimensional shaped object 1 can be given better abrasion resistance. Though not particularly limited, examples of what can be used as a surfactant include polyester-modified silicone or polyether-modified silicone serving as a silicone-based surfactant; of these, it is preferable to use polyether-modified polydimethylsiloxane or polyester-modified polydimethylsiloxane. Specific examples of surfactants include BYK-347, BYK-348, and BYK-UV 3500, 3510, 3530, and 3570 (which are trade names of BYK).

The inks 4 may also comprise a solvent. This makes it possible to favorably adjust the viscosity of the inks 4, and makes it possible to give the inks 4 particularly excellent stability of discharge by inkjet format even when the inks 4 comprise high-viscosity components.

Examples of solvents include: (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, isopropyl acetate, n-butyl acetate, and isobutyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; and alcohols such as ethanol, propanol, and butanol; it would also be possible to use one species selected from these or a combination of two or more species selected from these.

The viscosity of the inks 4 is preferably 10 to 25 mPa·s, more preferably 15 to 20 mPa·s. This makes it possible to give the inks particularly excellent stability of discharge by inkjet. In the present specification, "viscosity" refers to a value measured at 25° C. using an E-type viscometer (Visconic ELD made by Tokyo Keiki).

In the case where a plurality of different kinds of inks 4 are used, then it is preferable to use at least a cyan ink 4, a magenta ink 4, and a yellow ink 4. This makes it possible to further broaden the range of color reproduction that can be represented by combining these inks 4.

Also using a white ink 4 and an ink 4 of another color in combination produces, for example, the following effects. Namely, it is possible to endow the three-dimensional shaped object 1 that is ultimately obtained with a first region to which the white ink 4 is applied and a region which overlaps with the first region and to which an ink 4 of a color other than white is applied, provided closer to the outside surface than the first region. This makes it possible for the first region to which the white ink 4 is applied to exert masking, and makes it possible to further increase the color saturation of the three-dimensional shaped object 1.

Using the white ink 4, the black ink 4, and the ink 4 of another color in combination also produces, for example, the following effects. Namely, the combined use of the white ink 4 makes it possible to represent a color that is lighter and of higher brightness than what can be represented with the ink 4 of the other color; and the combined use of the black ink 4 makes it possible to represent a color that is lighter and of lower brightness than what can be represented with the ink 4 of the other color; and so doing further increases the color saturation of the three-dimensional shaped object 1 and also makes it possible to broad the width of brightness representation.

Preferred embodiments of the invention have been described above, but the invention is in no way limited thereto.

For example, in addition to the layer formation step and the ink application step, the embodiment described above describes also repeatedly carrying out the curing step in conjunction with the layer formation step and the ink application step, but the curing step need not be repeatedly carried out. For example, a laminate provided with a plurality of layers that are not cured may be formed first and then followed by curing en masse. In a case where a curable resin is not a curable component, then the curing step can be omitted.

In the method of manufacture of the invention, a pre-treatment step, an intermediate treatment step, and a post-treatment step may be carried out as needed.

An example of a pre-treatment step would be a step for cleaning the shaping stage.

Examples of post-treatment steps would include a cleaning step, a shape adjustment step for deburring and the like, a color step, a cover layer formation step, or a curable resin curing completion step for carrying out a light irradiation treatment or heating treatment in order to ensure curing of any curable resin that is not yet cured.

The embodiment above described applying the inks to all of the layers, but there may be a layer to which the inks are not applied. For example, the inks need not be applied to a layer that is formed directly on top of the shaping stage, this layer then functioning as a sacrificial layer.

The embodiment above centered the description on a case where the ink application step is carried out by inkjet, but the ink application step may also be carried out using another method (for example, another printing method).

Also, in the ink discharge step of the embodiment above, the configuration may be such that the total amount of discharged ink that is discharged onto one discharge unit region will be constant. This makes it possible to have a small difference in the volume shrinkage rate among the plurality of discharge unit layers, in addition to the effects from the embodiment above, and also makes it possible to curb the occurrence of an undesirable unevenness on the surface of the three-dimensional shaped object. Moreover, in a case configured so that the total amount of discharged ink that is discharged onto one discharge unit region will be constant, then the configuration may be such that an ejected amount of non-colored ink is determined in accordance with the discharged amount of colored ink. This makes it possible to give a more constant volume shrinkage to the discharge unit regions when made into the unit layers 7.

Also, preferably, in the curing step of the embodiment above, the volume shrinkage rate of the discharge unit regions when made into the unit layers 7 is constant irrespective of color. This makes it possible to curb the occurrence of any unevenness caused by differences in the shrinkage rate at the surface of the three-dimensional shaped object 1. As a result a more vivid color expression can be carried out at the surface of the three-dimensional shaped object 1. Saying that the volume shrinkage rate is constant means that the difference in volume shrinkage rate is within ±5%.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A method of manufacturing a three-dimensional shaped object with which unit layers are laminated, the method comprising:

forming a layer having a predetermined thickness A (μm) by using a three-dimensional shaping composition that contains a three-dimensional shaping powder having a plurality of particles; and discharging an ink that contains a binding agent onto the layer for each of a plurality of discharge unit regions of a surface of the layer to form corresponding one of the unit layers, the discharging of the ink including discharging two or more different kinds of the ink onto each of the discharge unit regions, the discharge unit regions being arranged from an outer margin of the corresponding one of the unit layers toward an interior of the corresponding one of the unit layers, each of the discharge unit regions being narrower than a square of the predetermined thickness $A^2$ ($\mu m^2$).

2. The method of manufacturing the three-dimensional shaped object as set forth in claim 1, wherein
the thickness A of the layer is 30 μm or greater and 500 μm or less.

3. The method of manufacturing the three-dimensional shaped object as set forth in claim 1, wherein
the $A^2$ ($\mu m^2$) is smaller than double an impact surface area of the ink.

4. The method of manufacturing the three-dimensional shaped object as set forth in claim 1, wherein
the ink is a color ink containing a colorant for cyan, magenta, yellow, black, or white, or a non-colored ink not containing the colorant.

5. The method of manufacturing the three-dimensional shaped object as set forth in claim 1, wherein
a total discharged amount of the ink that is discharged onto one of the discharge unit regions is constant.

6. The method of manufacturing the three-dimensional shaped object as set forth in claim 5, wherein
a volume shrinkage rate of the discharge unit regions when made into the unit layers is constant irrespective of color.

* * * * *